United States Patent
Racca et al.

(10) Patent No.: US 7,562,339 B2
(45) Date of Patent: Jul. 14, 2009

(54) SYSTEM ARCHITECTURE FOR BUSINESS PROCESS DEVELOPMENT AND EXECUTION WITH INTROSPECTION AND GENERIC COMPONENTS

(75) Inventors: Felix G. Racca, Irving, TX (US); Emilio L. Gabeiras, Buenos Aires (AR)

(73) Assignee: BEA Systems, Inc., San Jose, CA (US)

( * ) Notice: Subject to any disclaimer, the term of this patent is extended or adjusted under 35 U.S.C. 154(b) by 1278 days.

(21) Appl. No.: 10/050,316

(22) Filed: Jan. 15, 2002

(65) Prior Publication Data

US 2008/0307392 A1 Dec. 11, 2008

(51) Int. Cl.
*G06F 7/00* (2006.01)
*G06F 9/44* (2006.01)

(52) U.S. Cl. .................. 717/102; 717/100; 717/101; 717/103; 717/104; 717/105; 717/120; 717/107; 707/1; 707/10; 707/101; 707/102; 707/103 R

(58) Field of Classification Search ......... 717/114–124, 717/101–109; 707/1, 10, 102–104.1; 705/1, 705/7
See application file for complete search history.

(56) References Cited

U.S. PATENT DOCUMENTS

| | | | | |
|---|---|---|---|---|
| 5,734,837 | A * | 3/1998 | Flores et al. ................. | 705/7 |
| 6,434,740 | B1 * | 8/2002 | Monday et al. .............. | 717/108 |
| 6,542,908 | B1 * | 4/2003 | Ims ............................ | 707/204 |
| 6,553,563 | B2 * | 4/2003 | Ambrose et al. ............ | 717/116 |
| 6,601,234 | B1 * | 7/2003 | Bowman-Amuah ......... | 717/108 |
| 6,631,519 | B1 * | 10/2003 | Nicholson et al. ............ | 717/169 |
| 6,643,652 | B2 * | 11/2003 | Helgeson et al. ............ | 707/10 |
| 6,684,387 | B1 * | 1/2004 | Acker et al. ................. | 717/126 |
| 6,836,889 | B1 * | 12/2004 | Chan et al. .................. | 719/310 |
| 2002/0152254 | A1 * | 10/2002 | Teng ........................... | 709/100 |
| 2002/0188616 | A1 * | 12/2002 | Chinnici et al. ............. | 707/102 |
| 2003/0046282 | A1 * | 3/2003 | Carlson et al. ............... | 707/6 |
| 2003/0105644 | A1 * | 6/2003 | Ali et al. ..................... | 705/1 |
| 2003/0172368 | A1 * | 9/2003 | Alumbaugh et al. ........ | 717/106 |
| 2003/0195997 | A1 * | 10/2003 | Ibert et al. ................... | 709/318 |
| 2003/0212987 | A1 * | 11/2003 | Demuth et al. .............. | 717/130 |
| 2004/0015839 | A1 * | 1/2004 | Sarkar et al. ................ | 717/108 |
| 2004/0111730 | A1 * | 6/2004 | Apte ........................... | 719/330 |
| 2007/0226682 | A1 * | 9/2007 | Kilgore et al. ............... | 717/106 |

OTHER PUBLICATIONS

U.S. Appl. No. 10/050,319, filed Jan. 15, 2002, entitled "*Introspection Module For Business Process Development And Execution*," 75 total pages.
U.S. Appl. No. 10/050,577, filed Jan. 15, 2002, entitled "*A Debugger For Business Process Development And Execution*," 74 total pages.
U.S. Appl. No. 10/050,374, filed Jan. 15, 2002, entitled "*Analytical Data Browser For Business Process Development And Execution*," 74 total pages.

* cited by examiner

*Primary Examiner*—Insun Kang
(74) *Attorney, Agent, or Firm*—Fliesler Meyer LLP

(57) ABSTRACT

A system for designing a business process includes an introspection module that transforms implementation-specific components into generic components. The implementation-specific components are associated with a number of implementations. A component manager defines the generic components. A process designer selects at least one of the generic components from the component manager, and generates a business process that uses the at least one of the generic components.

20 Claims, 14 Drawing Sheets

SYSTEM ARCHITECTURE FOR BUSINESS PROCESS DEVELOPMENT AND EXECUTION WITH INTROSPECTION AND GENERIC COMPONENTS

TECHNICAL FIELD OF THE INVENTION

This invention relates generally to the field of business process automation and more specifically to a system architecture for business process development and execution.

BACKGROUND OF THE INVENTION

Organizations typically automate their business processes to manage their operations. A business process includes a series of activities that may be undertaken to perform the operations of an organization. For example, a business process may describe activities for processing a sales order, such as the steps of receiving a sales order, checking payment history, checking inventory, and so on. An organization may automate a business process by having a computer perform some activities such as receiving a sales order.

Automating business processes, however, has posed challenges. Designing and executing automated business processes may involve the use of multiple programming languages to integrate with backend applications. It may also involve the use of diverse client side devices and related applications to interface with people involved in a business process. The diversity of languages, devices, applications, people skills, geographies, and cultures may pose a challenge to automating a homogeneous business process that delivers a quality product and/or service to a diverse set of customers.

SUMMARY OF THE INVENTION

In accordance with the present invention, business process development and execution is provided that substantially eliminate or reduce the disadvantages and problems associated with previously developed techniques.

According to one embodiment of the present invention, a system for designing a business process includes an introspection module that transforms implementation-specific components into generic components. The implementation-specific components are associated with a number of implementations. A component manager defines the generic components. A process designer selects at least one of the generic components from the component manager, and generates a business process that uses the at least one of the generic components.

Certain embodiments of the present invention may provide technical advantages. A technical advantage of one embodiment may be that business processes may be readily designed using components from multiple programming languages and enabling technologies. Another technical advantage of one embodiment may be that the embodiment provides a debugger that detects errors in a business process during the design stage. Another technical advantage of one embodiment may be that the embodiment provides a data analyzer that analyzes statistical data describing the execution of the business processes for organizational analysis.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 17 of the drawings, like numerals being used for like and corresponding parts of the various drawings.

System Architecture

Figure 1:
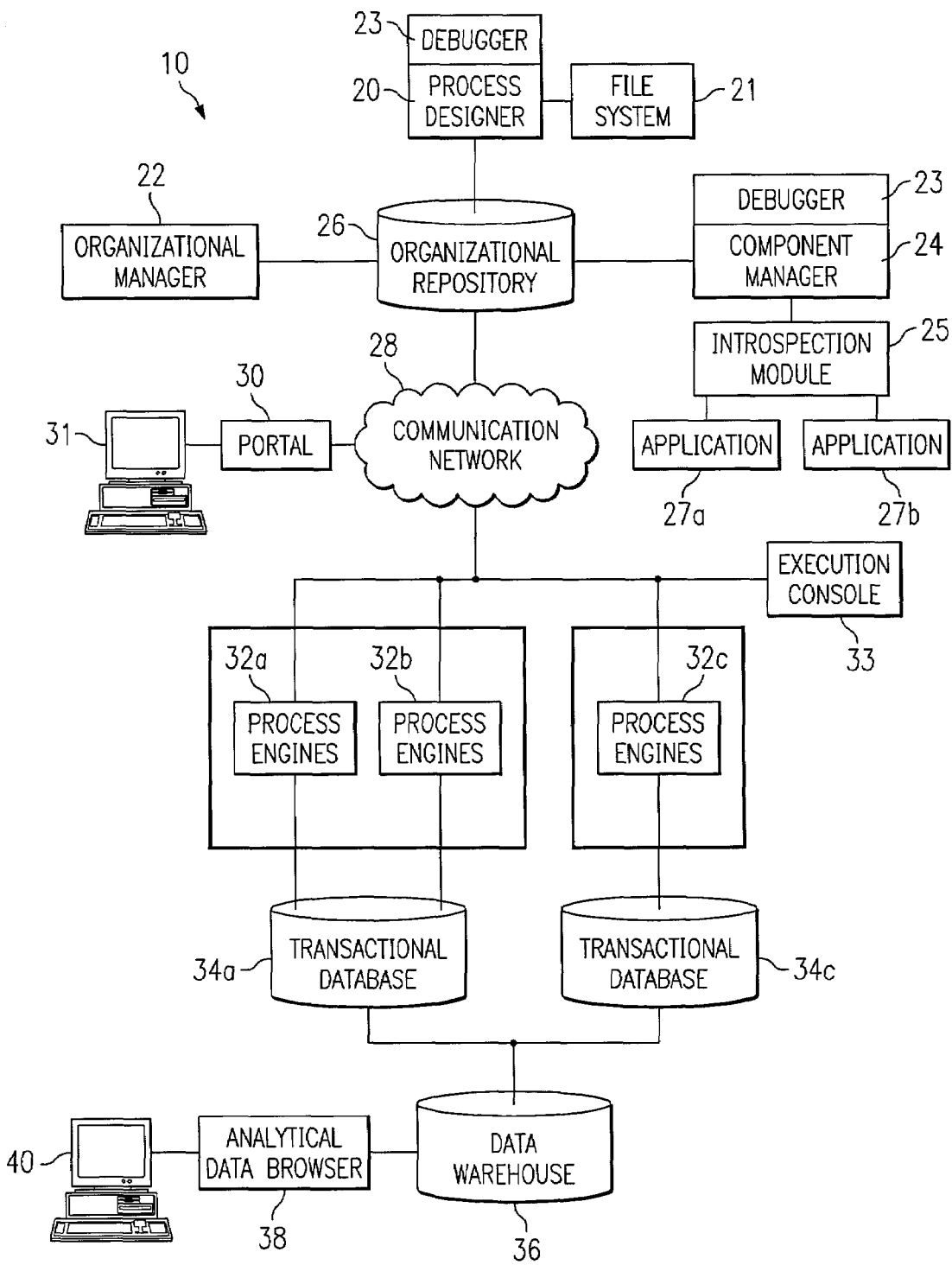
FIG. 1 is a block diagram of an example system for developing and executing one or more business processes.

FIG. 1 is a block diagram of one example of a system 10 for developing and executing one or more business processes. A business process includes a series of activities that are undertaken to perform the operations of an organization. For example, a business process may describe activities for processing a sales order, such as the steps of receiving a sales order, checking payment history, checking inventory, and so on. Business processes are described in more detail with reference to FIG. 2. System 10 integrates services from people, computer applications, and organizations that include people and computer applications to generate business processes that provide new, higher level business services.

System 10 provides a business-centric approach towards business integration, where a designer may determine the activities needed to be performed in order to build and deliver a certain product or service. A business process that invokes services from an application to perform the tasks of activities may then be designed. System 10 may typically directly access an application programming interface (API) of an application using only services that are needed based on business process needs of a particular process activity. In contrast, other techniques create an adapter exposing a whole API or at least unnecessary portions of an API in case that functionality is needed. Other techniques usually expose all the functionality of an application since otherwise the adapter will need multiple modifications causing maintenance problems. This exposes security problems or holes. Referring back to system 10, the applications may be on the front end interacting with a human or on the back end interacting with a backend system. Thus, system 10 provides an active way of invoking an application's functionality for the specific purpose of implementing business processes.

According to one embodiment, system 10 provides for the design of business process that may be distributed over a network such as the Internet and that may interact with different applications. The business processes do not impose restrictions since the same model may be applied over a centralized or distributed approach. Accordingly, an organization may design and implement a federation of highly distributed business processes using system 10.

According to one embodiment, the business-centric approach of system 10 may be seen as an alternative to an application-centric approach towards integration. In typical application-centric integration, an event bus is used to execute methods of an application. An adapter or a connector to an event bus listens for messages intended for the application, executes a method of the application in response to receiving a message, and places a return value, if any, from the method on the event bus.

Application-centric integration, however, has flaws. Application-centric integration requires that programmers determine the interactions that an application will have, which involves identifying the combinations of events that might affect the application and the corresponding responses of the application based on other application events. This may also involve coordinating with previously exposed functionality of the application or creating new functionality for the application. The application is then coupled to an event bus in such a way that the determined interactions may take place. It may be even worse if each vendor uses its own proprietary bus.

In some situations, the required applications may not be connected to the event bus, which may result in methods that cannot be executed. Moreover, even if the applications are connected to the event bus, the connections may not be able to ensure the functionality of the applications. For example, an application may be listening for events from other applications that may never reach the application. Conversely, the application may post events that may not reach another application. Consequently, although applications may be listening for events and placing events on the event bus, integration may not occur.

Furthermore, an application may be designed to expose a vast amount of capabilities, but uses only a few of those capabilities when communicating with another application, resulting in a waste of resources. Additionally, the event bus may comprise proprietary material, and thus may have restrictions on its use. Consequently, application-centric integration poses problems, which may be inherently based on the designed architecture of a bus.

Additionally, known techniques address services from only people, applications, or organizations, but not all three, from a messaging metaphor. For example, workflow technologies address services from people, enterprise application integration technologies address services from applications, and business-to-business integration technologies address services from organizations, which may be mainly external organizations. None of these techniques were built from the ground up to simultaneously address the three services from a programmatically invokable service metaphor. System 10 provides for the ability to integrate services from people, applications, and organizations, whether they are internal or external, in a single seamless process.

According to the example of FIG. 1, an organization may comprise a data set of users that may represent, for example, people who may interact with system 10. An organization may include users that represent people who are responsible for performing tasks of activities of a business process. For example, a user may be responsible for receiving a sales order and verifying its completeness, which may be logically represented as tasks within activities of a business process.

The users may be organized into user sets (roles), where the users of a user set represent people who are responsible for the execution of specific activities. A user may be a member of any number of user sets. User sets may be associated with, for example, organizational roles defined within an organization, such as a salesperson role.

An organization may include organizational units, which may be associated with divisions within the organization such as departments or office locations. For example, an organizational unit may be associated with a particular department such as a sales department or a particular office location such as a Dallas office location.

Organizational units are used to group users into logical groups and may be used to specify the users that may access published and deployed business processes based on the organizational units where the business processes are deployed. For example, an organization develops a business process for processing a sales order that deals with operations in a sales department and no other department. The business process may be published and deployed to an organizational unit associated with the sales department such that only the users of the organizational unit, and no other users of the organization, may access the business process.

Referring to FIG. 1, system 10 includes a process designer 20, an organizational manager 22, and a component manager 24 coupled to a organizational repository 26, which is in turn coupled to a communication network 28. A portal 30 may interact with system 10 through communication network 28. System 10 may also include one or more process engines 32 coupled to communication network 28 and transactional databases 34, which are in turn coupled to a data warehouse 36. An analytical data browser 38 is coupled to data warehouse 36, and a computer 40 may be coupled to analytical data browser 38.

Process designer 20 allows a designer to design business processes, which are stored in organizational repository 26 when the business process is published. Before that, the business process may be stored in a local file system of the designer designing the business process. Process designer 20 may also be used to publish business processes to organizational repository 26 as well as to deploy business processes to process engines 32. Process designer 20 may use a debugger 23 to locate errors when designing business rules of business processes. Process designer 20 and debugger 23 are described in more detail with reference to FIGS. 5 through 8.

Component manager 24 defines, describes, and organizes components. A component may be seen as a service to access a backend application. A component may comprise a modular software routine that has been compiled, and may be used with other components or programs when creating business rules. Component manager 24 stores components in a catalog of organizational repository 26 and supplies components definitions to process designer 20 and process engines 32.

Component manager 24 uses an introspection module framework 25 to automatically generate a catalog through introspection of exposed application programming interfaces (API) of applications 27. Introspection module 25 may access components of applications 27 written in any of a number of programming languages or technologies. Component manager 24 and introspection module 25 access an application programming interface of application 27, discover the structure of the components of application 27, and automatically create entries in the catalog for selected components. Once the component is selected, methods and attributes may be selected to be exposed to the persons coding the business rules of business process 78. An entry of the catalog may include metadata that describes the component. By performing these steps, component manager creates generic component wrappers that may be readily executed by scripts 88 of business process 78. Component manager 24 and introspection module 25 are described in more detail with reference to FIGS. 10 through 15.

Process designer 20, component manager 24, and introspection module 25 allow for the design of a business process that controls the invocation of services from underlying applications 27 from tasks 86 defined in process task in process activities 80. The business rules of business process 78 includes instructions on what to invoke in applications 27, and can directly access a native application programming interface without exposing applications 27. Applications 27 are accessed based on component definition introspection performed with component manager 24. Accordingly, system 10 provides an active way to invoke application 27 for the specific purpose of executing a task 86.

According to one embodiment, process designer 20 and component manager 24 allow for business processes to be designed on a computer by manipulating graphical icons on a computer screen. These manipulations are stored in a file system 21. An example of a computer screen that may be used to design a business process is described with reference to FIG. 2.

Figure 2:
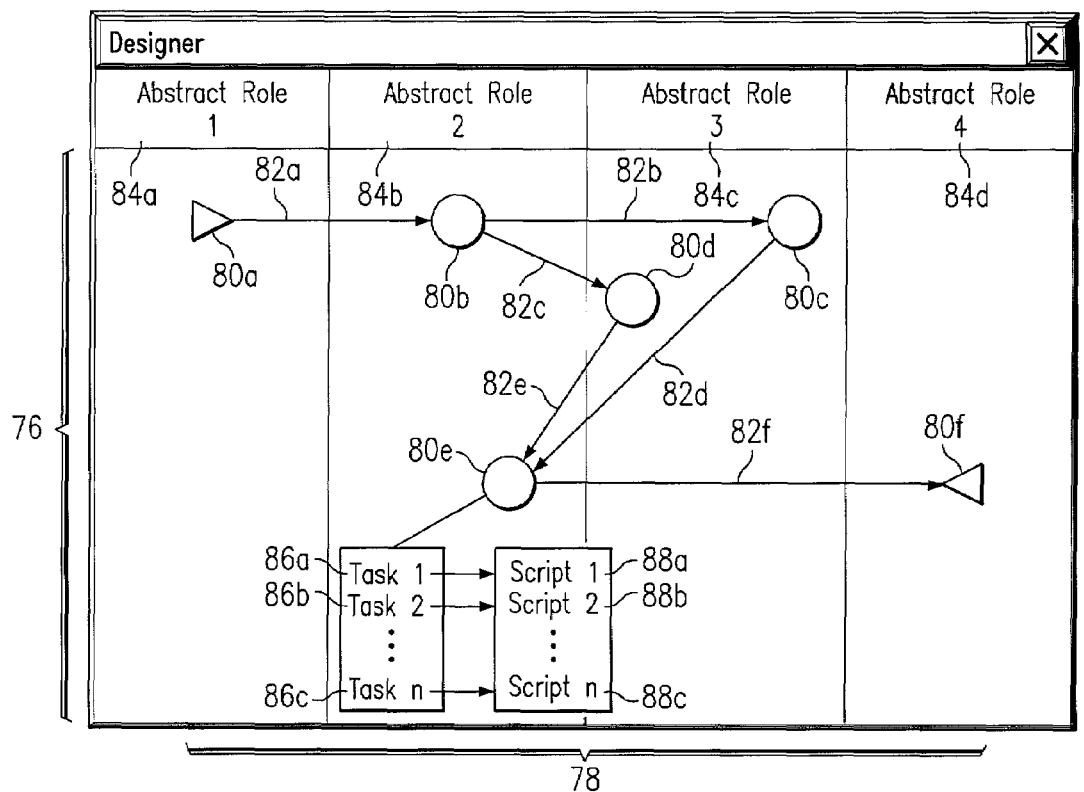
FIG. 2 illustrates an example designer screen for designing one or more business processes on a computer.

FIG. 2 illustrates an example of a designer screen 74 for designing one or more business processes 78 on a computer. Business process 78 includes a sequence of activities 80 coupled by transitions 82. For example, business process 78 may include a sequence of activities 80 for processing a sales order.

Each activity 80 comprises a series of tasks 86 that are executed in order to complete activity 80. "Each" as used in this document refers to each member of a set or each member of a subset of the set. For example, an activity 80 that notifies a client of an incomplete sales order may include the task of "sending an email message to the client." A task 86 may be executed according to a corresponding script 88, which may be written in any computer language, for example, COMPONENT INTEGRATION LANGUAGE of FUEGOTECH BPM by FUEGO, INC., also known as FUEGOTECH, INC., or other suitable meta language. Tasks 86 may execute components catalogued by component manager 24 when its execution is required after business process 787 has been published and deployed in process engines 32 or when debugging from business designer 20 or component manager 24.

To design business process 78, activities 80 are placed in a designer window 76. Activities 80 may have specific features or semantics, which may be designated by a particular color and/or shape. For example, activity 80a may be an activity that is used to begin a business process, and may be designated by a triangular shape pointing in the right-hand direction. Activity 80f may be an activity that is used to end a business process, and may be designated by a triangular shape pointing in the left-hand direction.

An activity 80 of a business process 78 may connect to a subprocess that operates as a business process 78. The subprocess includes child activities 80, and the business process 78 includes parent activities 80. Business subprocess 78 may in turn connect to another business process 78.

Transitions 82 are used to indicate a next activity that is to be initiated after executing a previous activity. For example, transition 82a indicates that activity 80b is to be initiated after the execution of activity 80a.

Transitions 82 may indicate multiple next activities that are to be initiated after the execution of a previous activity. For example, transitions 82b and 82c indicate that activities 80c and 80d, respectively, are to be initiated after the execution of activity 80b. Depending upon how business process 78 is defined, either one or both activities 80c and 80d may be initiated after activity 80b. For example, business process 78 may be defined such that depending upon a decision made at activity 80b, either activity 80c or activity 80d is initiated after the execution of activity 80b. Additionally, transitions 82 may direct multiple activities to a single next activity. For example, transitions 82d and 82e direct activities 80c and 80d, respectively, to activity 80e.

Business process 78 includes abstract roles 84 that are used at design time to represent, in the abstract, user sets that represent the people of an organization who are responsible for performing an activity 80. Abstract role 84 may be matched to an organizational role when business process 78 is published. An abstract role represents in the abstract a user set responsible for performing the activity, and the organizational role may take on values that correspond to actual user sets of an organization. For example, an abstract role represents salespeople in the abstract, and the organizational role describes actual salespeople of an organization. At design time, abstract roles are used instead of organizational roles, which allows for a single business process to be re-used for multiple organizations.

An organizational role may be parametric, that is, the organizational role may be assigned a value that corresponds to a user set that is a subset of a larger user set. For example, one user set may represent salespeople from one state, and another user set may represent salespeople from another state. Thus, an organizational role may be used to create groups of users that can be instantiated with, for example, salespeople from different states. Activities placed within an abstract parametric role are the same across the different subgroups that can be defined for the abstract parametric role.

Abstract roles 84 are specified for activities 80 by placing activities 80 in the appropriate abstract role column. For example, abstract role 84a is specified for activity 80a, and abstract role 84b is specified for activities 80b and 80e. To summarize, business process 78 may include activities 80 coupled by transitions 82 and associated with abstract roles.

As business process 78 is being created, documentation describing business process 78 may be generated by the designer or business analyst. The documentation is based on documentation added to the business process. The documentation that can be automatically generated based on the documentation added to the business process may comprise, for example, a hypertext markup language (HTML) document that includes, for example, a graphical representation of business process 78, documentation created by the designer, information about activities 80 such as associated abstract roles, and scripts 88 written to perform tasks 88. The documentation may also include a uniform resource identifier that represents a sub-process called by business process 78.

System 10 allows a designer to pre-define a business process 78 that manages activities 80 within business process 78. System 10 provides for the management of tasks 86 of activities 80, management of roles involved in performing human tasks 86, and management of components involved in performing automated tasks 86. System 10 provides designer screen 74 that may be used to design business process 78 in a graphical format. Designer screen 74 allows a designer to depict business processes 78, activities 80, and transitions 82 between activities 80.

Referring back to FIG. 1, organizational manager 22 defines the settings for organization. Organizational settings may describe the user sets, organizational roles and associated values, and organizational units of an organization, as well as holiday and calendar rules. Organizational repository 26 stores data used by system 10, and is described in more detail with reference to FIG. 3.

Communication network 28 may comprise, for example, a public switched telephone network, a public/private data network, the Internet, a wired/wireless link, a local, regional, or global communication network, or any suitable combination of the preceding. According to one embodiment, system 10 may be distributed across the Internet. Business processes 78 across the Internet may know of each other's existence, make calls to each other, and message each other without comprehending the messaging implementation of system 10.

Portal 30 provides for interaction with system 10. If an activity 80 requires user participation, process engines 32 push work to the user through portal 30. Portal 30 enforces the roles and permissions as defined in organizational repository 26 and displays activities relevant to the user. A user may use computer 31 to interact with portal 30 deployed in a website. Portal 30 may connect to organizational repository 26 to enforce portal 30 security based on roles. The connectivity may be enforced by communication network 28. In turn, portal 30 may connect to a federation of process engines 32 to execute tasks requested by a user interfacing through computer 31 based on business process 78 and activities 80 that are available for execution based on roles assigned and defined for the user in organizational repository 26.

Computer 31 may be used to access system 10 through portal 30. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Process engine 32 executes and manages instances of a deployed business process 78. An example of an instance of a business process 78 may be processing a specific sales order using a business process for processing sales orders. Process engine 32 retrieves business process 78 from organizational repository 26, executes an instance of business process 78, and stores information about the instance (state) in transactional database 34. Each process engine 32 may be associated with one or more transactional databases 34. Each process engine 32 may be associated with one or more organizations, such that each process engine 32 executes business processes 78 published with the organizational information of an associated organization.

According to one embodiment, process engines 32 may also operate as a process container and provide business processes 78 with services for communicating with other business processes 78 across the Internet. For example, process engines 32 may listen for messages across the Internet, start business process 78 in response to receiving a message, manage the interaction with users across the Internet, and manage the persistency of instance variables or process instance variables across extended business process executions.

Process engines 32 may also provide a remote method integration (RMI) service that allows process engines 32 to communicate with each other, even through firewalls. Additionally, process engines 32 may ensure unity, that is, ensure that unnecessary repeated messages are not delivered. Process engines 32 provide these services so a designer does not need to worry about the implementation of these services. This messaging may take place when business process 78 is deployed in process engines 32.

Process engines 32 execute a worldwide web of business processes 78 in a manner analogous to web engines or worldwide web services. Process engines 32 include the definition of business process 78 and insure that the definition is executed at each point of business process 78.

An execution console 33 defines and manages process engines 32. For example, execution console 33 defines port settings for process engines 32 and database settings for transactional databases 34 associated with process engines 32. Execution console 33 may also be used to publish and deploy business processes 78.

Transactional databases 34 include persistence of process instance variables that record transactional data that is typically maintained for an instance of a business process. For example, a value describing the requested quantity of goods for a specific sales order is typically maintained for the instance that processes the specific sales order. The value is generally not needed for process instances that process other sales orders. Persistent process variables include process instance variables and argument variables. Process instance variables record values that may be passed from one activity of a business process to another activity of the same business process. Argument variables record values that may be passed from one business process to another business process.

Data warehouse 36 stores data received from transactional databases 34, which includes transactional data that is typically maintained for an instance of a business process. This is typically known as instance audit trail or instance event data. Data warehouse 36 may be updated periodically to reflect the latest changes. Data warehouse 36 may comprise an on-line analytical processing (OLAP) data warehouse. Analytical data browser 38 is used to analyze the transactional information stored in data warehouse 36. The transactional information may be used to detect, for example, an activity 80, user, or application 27 that is not performing as intended.

Analytical data warehouse 36 may be used to consolidate, drill-down, slice, dice, and pivot organization-wide data. Results may be reported using database formats or graphical charts. Users may directly manipulate data in order to, for example, identify trends, correlate information, or map-out a series of events. Analytical data browser 38 may provide value by placing information, regardless of where it is located, in a frame of reference to facilitate better informed business decisions. Analytical data browser 38 is described in more detail with reference to FIGS. 16 and 17. Computer 40 may be used to interact with analytical data browser 38.

System 10 may provide advantages in developing and executing business processes 78. Process designer 20 may use debugger 23 to locate problems when designing a business process 78 and defining its business rules. Process designer 20 and debugger 23 are described in more detail with reference to FIGS. 5 through 9. Component manager 24 may use introspection module 25 to access backend applications based on any of a number of implementations. Component manager 24 and introspection module 25 are described in more detail with reference to FIGS. 10 through 15. Moreover, analytical data browser 38 may be used to analyze transactional information. Analytical data browser 38 is described in more detail with reference to FIGS. 16 and 17. Consequently, system 10 may provide a foundation upon which an organization may design and implement a federation of highly distributed business processes 78.

Figure 3:
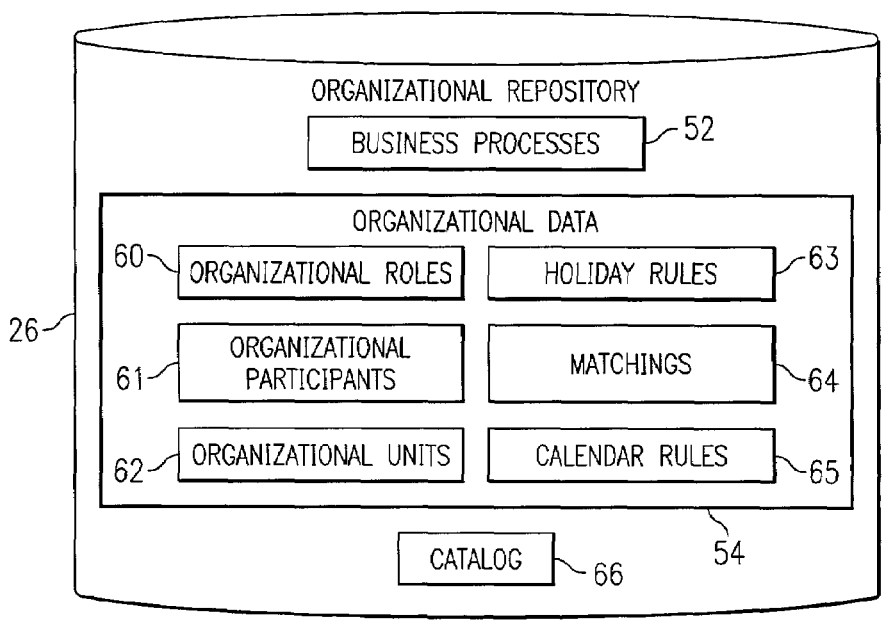
FIG. 3 is a block diagram of an example organizational repository of FIG. 1.

FIG. 3 is a block diagram of an example of organizational repository 26 of FIG. 1. Organizational repository 26 includes information that is typically maintained through multiple business process publications. Organizational repository 26 may comprise, for example, a lightweight directory access protocol (LDAP) database. Organizational repository 26 includes business processes 52, organizational data 54, and a catalog 66. Business processes 52 include activities, transitions between the activities, and abstract roles associated with the activities as well as the abstract organizational hierarchy or role matchings 64.

Organizational database 54 includes organizational information about an organization. Organizational roles 60 include information about organizational roles and values. Organizational roles are matched with abstract roles at publish time in order to specify users representing people who are responsible for performing the activities of business processes 52. Matchings 64 record the association between abstract roles and corresponding organizational roles.

Other organizational information may include, for example, organizational participants 61, organizational units 62 and calendar rules 65. Calendar rules may describe holiday rules 63, working hours, and time zones, which may be used to coordinate the execution of business processes 78 distributed over a large geographical region. The organizational information may be used by analytical data browser 38 to analyze transactional data.

Catalog 66 includes components that are accessible by other modules of system 10 such as process designer 20. The components may come from applications 27 that are not accessible by the other modules. Introspection module 25 transforms non-accessible components from applications 27 to components accessible by the other modules. Catalog 66 may be maintained by component manager 24 when synchronizing with organizational repository 26.

Figure 4:
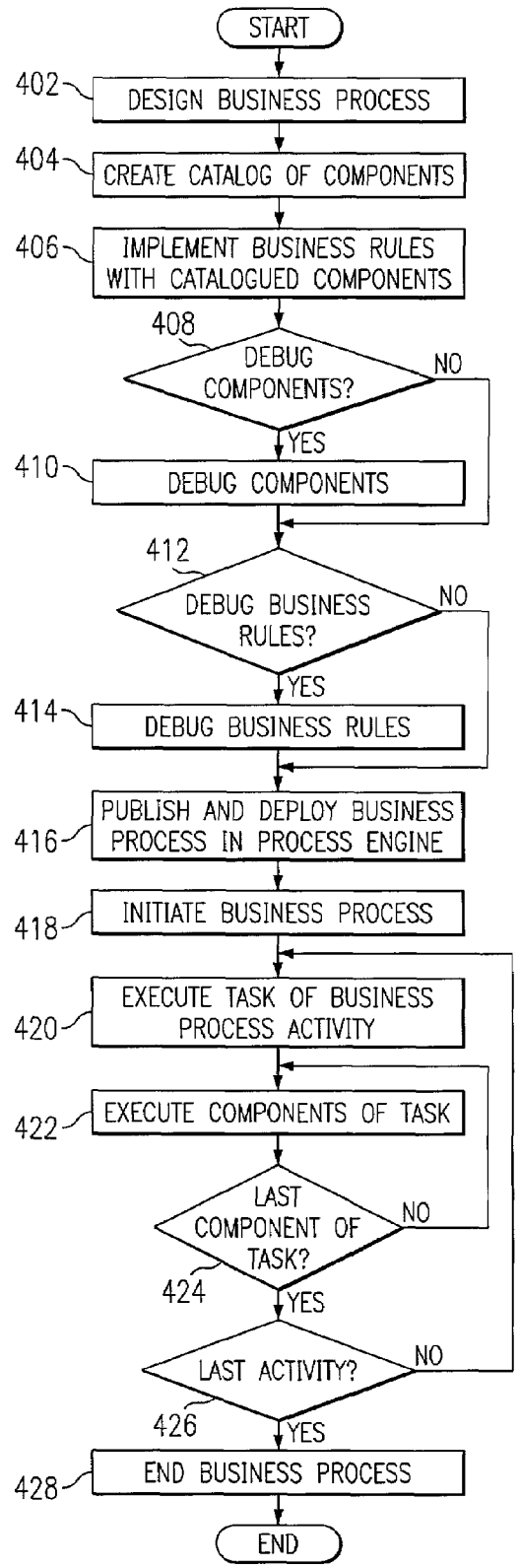
FIG. 4 is a flowchart illustrating an example method for generating and executing a business process.

FIG. 4 is a flowchart illustrating an example of a method for generating and executing a business process 78. Steps 402 through 416 describe generating business process 78, and steps 418 through 428 describe executing business process 78. The method begins at step 402, where business process 78 is designed. Business process 78 may be designed to satisfy business needs of an organization. Business process 78 includes activities 80 that have services to be executed at each activity 80.

Catalog 66 of components is created at step 404. The components of catalog 66 may be created to fulfill the services of activities 80. Component manager 24 generates catalog 66 using introspection module 25 to access applications 27. Applications 27 may be implemented in a variety of programming languages or technologies in order to implement business rules specified for business process 78 at step 406. Business rules may be specified by associating a script 88 with a task 86 of each activity 80 of business process 78.

The components may be debugged at step 408. If the components are to be debugged, the method proceeds to step 410 to debug the components. If the components are not to be debugged, the method proceeds directly to step 412. At step 412, the business rules may be debugged. If the business rules are to be debugged, the method proceeds to step 414 to debug the business rules. If the business rules are not to be debugged, the method proceeds directly to step 416.

At step 416, business process 78 is published and deployed into process engine 32. A publication procedure performs a component binding with an application 26 that the procedure has to invoke. The component binding identifies a component to invoke based on the components of catalog 66. The procedure that generates the code for business process 78 identifies the programming language or technology in which the identified component is implemented. Depending upon the implementation, the code generated for the component may vary. For example, the code to invoke a JAVA component will not be the same as the code to invoke an automation component or an SQL component. When the generated code is invoked by process engine 32, process engine 32 knows what to execute and how to locate and execute the bound component.

After publication and deployment, the business rules of business process 78 are transformed into compiled code, for example, compiled JAVA code, that can be executed by process engines 32. The deployed business process 78 is ready to process instances created to achieve the execution of business process 78.

At step 418, business process 78 is initiated. A business process may be instantiated by a user or by an automated step. Tasks 86 of business process activities 80 are executed at step 420 by executing the components of tasks 86 at step 422. If the last component of task 86 has not been reached at step 424, the method returns to step 422 to continue executing the components of task 86.

If the last component of task 86 has been reached at step 424, the method proceeds to step 426 to determine whether the last activity 80 of business process 78 has been reached. If the last activity 80 has not been reached, the method returns to step 420 to execute a task 86 of a next activity 80. The process instance may be routed by process engine to the next activity 80. Process engines 32 may have multiple process instances flowing through activities 80 of business process 78. If the last activity of business process 78 has been reached, the method proceeds to step 428 to end business process 78. After ending business process 78, the method terminates.

The method allows for an business centric integration, by providing the capabilities to request a component from any of a number of applications 27. Catalog 66 includes components that are executable by the modules of system 10. Business processes 78 may be readily designed using the executable components of catalog 66. Additionally, components of catalog 66 may be selected such that catalog 66 includes components that are likely to be used in business processes 78, which may avoid overloading catalog 66 with components.

Process Designer and Component Manager Debugger

Figure 5:
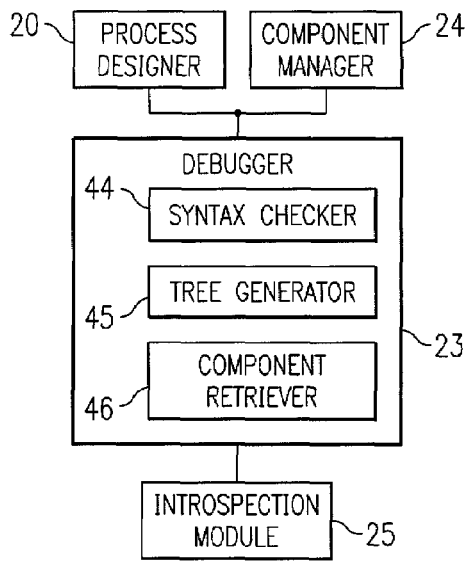
FIG. 5 is a block diagram illustrating an example debugger of FIG. 1.

FIG. 5 is a block diagram illustrating an example of debugger 23 of FIG. 1. Process designer 20 may activate debugger 23 in order to check scripts 88 written for business processes 78.

Debugger 23 may include a syntax checker 44, a tree generator 45, and a component retriever 46. Syntax checker 44 checks the syntax of scripts 88. Syntax checker 44 may apply syntax rules to scripts 88 in order to determine syntactical errors. Syntax checker 44 may check whether business rules must conform to the grammar and the syntax of invoked components. Tree generator 44 generates a tree that represents a script 88. Debugger 23 uses the tree to check for errors. An example of a tree is described in more detail with respect to FIG. 6.

Component retriever 46 is used to invoke a component bound to an application 27. When debugger 23 reaches a node of a generated tree that requires a component invocation, debugger 23 knows what and how to invoke based on information catalogued in catalog 66. Debugger 23 may use introspection module 25 to execute or invoke a component. Using debugger 23, a developer of components or business rules may be able to identify problems before business process is published, deployed, or executed at run time by process engines 32.

Figure 6:
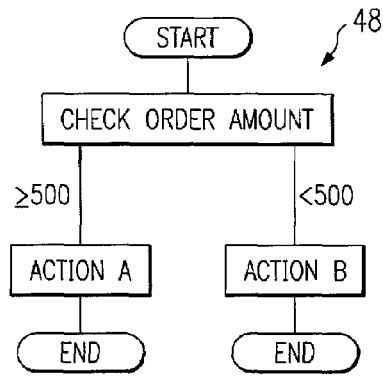
FIG. 6 illustrates an example tree that may be used to represent a script that is going to be executed by a debugger.

FIG. 6 illustrates an example of a tree 48 that may be used to represent script 88. In the illustrated example, script 88 comprises:
If order amount >=500, then
    Action A,
else Action B.

Action A may comprise, for example, "Place order in SAP", and Action B may comprise, for example, "Place order in Microsoft Excel."

Tree 48 represents the sequence of actions performed by script 88. In the illustrated example, the first action is to check the order amount. Branches "greater than or equal to 500" and "less than 500" represent the two conditions of script 88, and point to the action performed as a result of the condition. For example, if the order amount of greater than or equal to 500, Action A is performed, and if the order amount is less than 500, Action B is performed.

Trees 48 representing other scripts 88 may differ from the illustrated example tree 48. Additionally, other methods of representing scripts 88 may be used.

Figure 7:
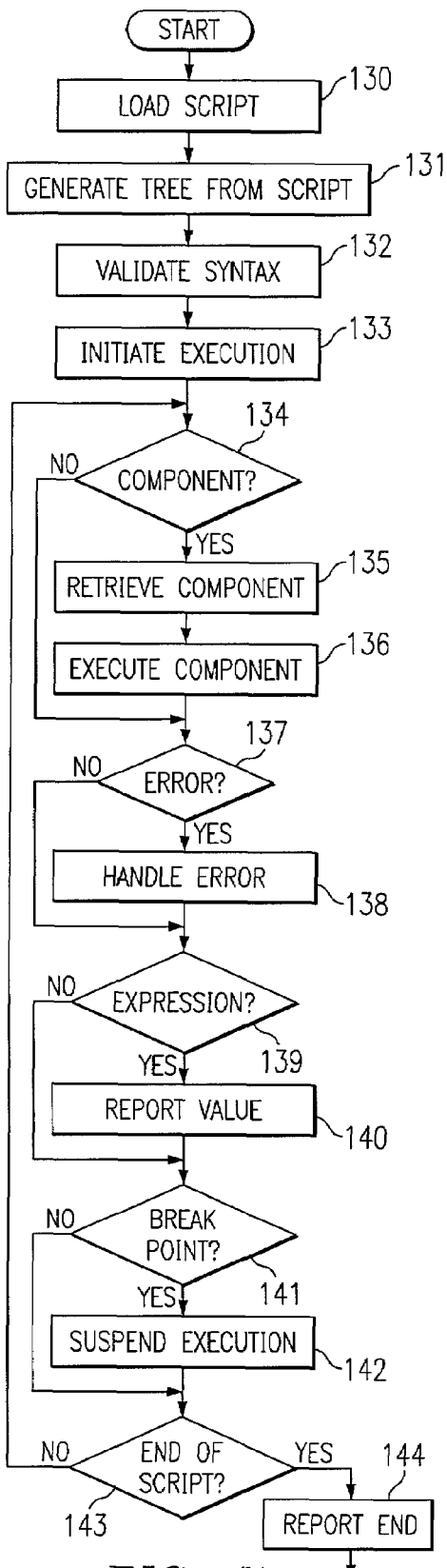
FIG. 7 is a flowchart representing an example method for debugging a script.

FIG. 7 is a flowchart representing an example method for debugging a script 88. The method begins at step 130, where debugger 23 loads script 88. Tree generator generates tree 48 from script 88 at step 131. Syntax checker 44 validates the syntax of script 88 at step 132. Syntax checker 44 may check whether business rules follow the grammar of the utilized metalanguage, for example, COMPONENT INTEGRATION LANGUAGE of FUEGOTECH BPM by FUEGO, INC., also known as FUEGOTECH, INC., and whether components satisfy the interface of applications 27 catalogued in catalog 66.

Execution of script 88 is initiated at step 133. If there is a component to be executed at step 134, the method proceeds to step 135. At step 135, component retriever 47 retrieves the component and binds the component to application 27 to be invoked. Debugger 23 may use introspection module 25 to retrieve the component. Introspection module 25 executes the component for debugger 23 at step 136. Introspection module 25 may also determine an output value, if any, of an executed component. The method proceeds to step 137. An error may be handled by business rules or by default error rules of debugger 23 at step 138. If there is no error detected at step 137, the method proceeds directly to step 139.

At step 139, debugger 23 determines whether an expression of script 88 is to be evaluated. An example screen for requesting evaluation is described with reference to FIG. 9. If an expression is to be evaluated, the method proceeds to step 140. At step 140, debugger 23 reports the value of the expression, and the method proceeds to step 141. If there is no expression to be evaluated at step 139, the method proceeds directly to step 141.

At step 141, debugger 23 determines whether a requested breakpoint has been reached for the next line to be executed. A user may request that debugger 23 suspends execution at specified breakpoints of script 88. If a breakpoint has been requested, the method proceeds to step 142. At step 142, debugger 23 suspends execution of script 88 until a message to continue or resume execution is received, and the method proceeds to step 143. If no breakpoint has been requested at step 141, the method proceeds directly to step 143.

Debugger 23 determines whether the end of the script has been reached at step 143. If the end of the script has not been reached, the method returns to step 134 to determine whether a component needs to be executed or an expression needs to be evaluated. If the end of script 88 has been reached, the method proceeds to step 144, where debugger 23 reports the end of script 88. After reporting the end of the script, the method terminates.

Figure 8:
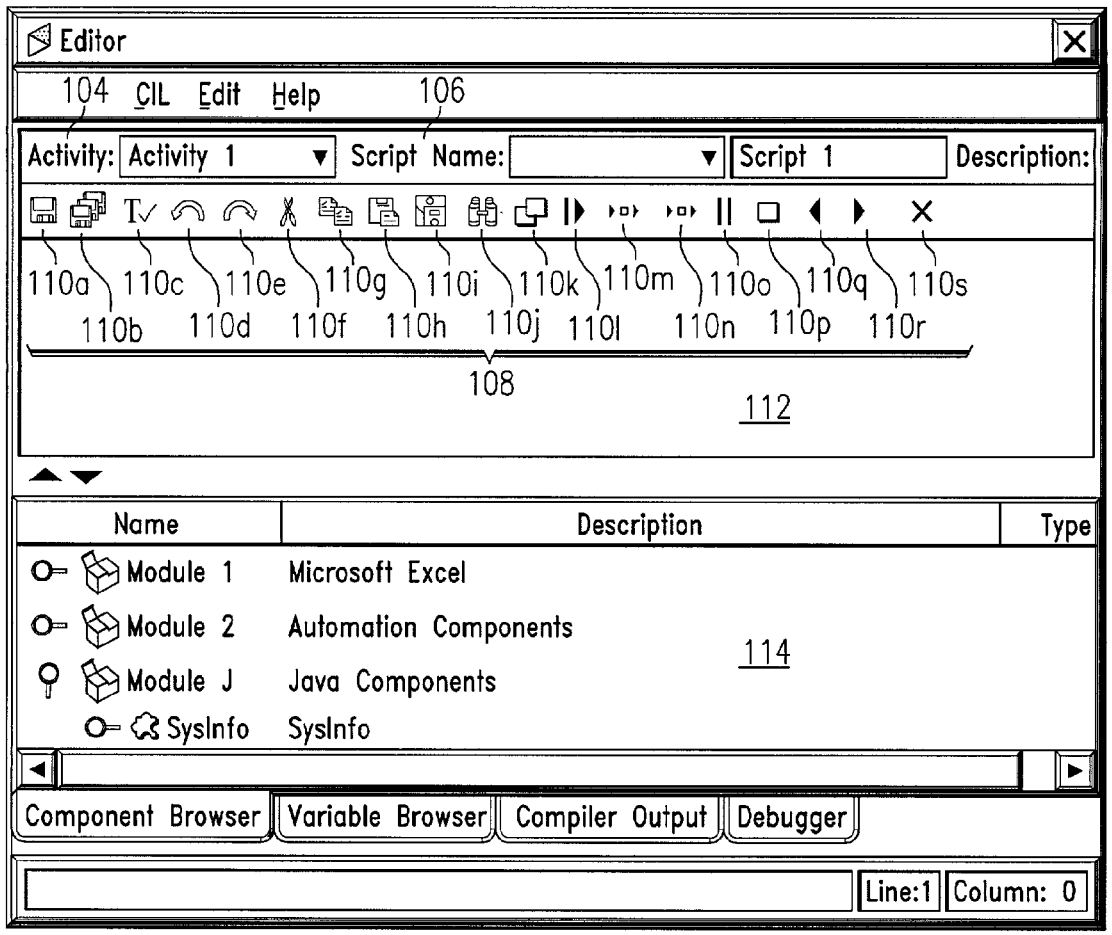
FIG. 8 illustrates an example screen for editing a script of an activity.

FIG. 8 illustrates an example screen 102 for editing a script 88 of an activity 80. Screen 102 includes an activity name 104 and a script name 106. A toolbar 108 includes buttons 110 that may be used to perform editing and debugging functions. In one embodiment, buttons 110 may perform the functions described in TABLE 1.

TABLE 1

| Description | Function |
| --- | --- |
| Save 110a | Save 110a writes a copy of the script to a memory. This action saves the most current changes made to the script. |
| Save All 110b | Save All 110b writes a copy of the most current changes in the script and in the entire business process to a memory. |
| Check Syntax 110c | Check Syntax 110c analyzes the script for syntactical errors. It checks for compliance with CIL grammar. |
| Undo & Redo 110d and e | Undo 110d cancels the last change made to the script. Redo 110e cancels the last Undo action. |
| Cut 110f | Cut 110f stores highlighted information in memory and copies the information to a clipboard and removes the information from editing panel 112. |
| Copy 110g | Copy 110g captures highlighted information to a clipboard. |
| Paste 110h | Paste 110h restores information stored on a clipboard (from a Cut or Copy) into screen 112. |
| Go to Line 110i | Go to Line 110i moves the cursor to the line number entered in the dialog box. |
| Find 110j | Find 110j locates the requested information in a script. (Looking for patterns.) |
| Find & Replace 110k | Find and Replace 110k locates the requested information in the script and replaces it with designated information. |
| Run 110 (Debugger) 110l | Run 110l executes the script in debug mode, which displays the output of a script before publication and deployment. |
| Step (Debugger) 110m | Step 110m proceeds through each script statement in debug mode. |
| Ignore Step (Debugger) 110n | Ignore Step 110n ignores a next step as the debugger proceeds through the script statements. |
| Suspend (Debugger) 110o | Suspend 110o pauses a script that is running in debug mode. |
| Stop (Debugger) 110p | Stop 110p ends a script that is running in debug mode. |
| Back (Debugger) 110q | Back 110q returns to a previous step in a script during debug mode. Back 110q recovers the state before executing the last step. |
| Forward (Debugger) 110r | Forward 110r advances to the next step in the script after the Back option in debug mode has been selected. |

TABLE 1-continued

| Description | Function |
| --- | --- |
| Exit (Debugger) 110s | Exit 110s closes the script debug session. |

An editing panel 112 displays scripts 88. A catalog window 114 displays modules, components, methods, properties, and attributes available in catalog 66. These components are the ones introspected before as in 91 of FIG. 4a.

Figure 9:
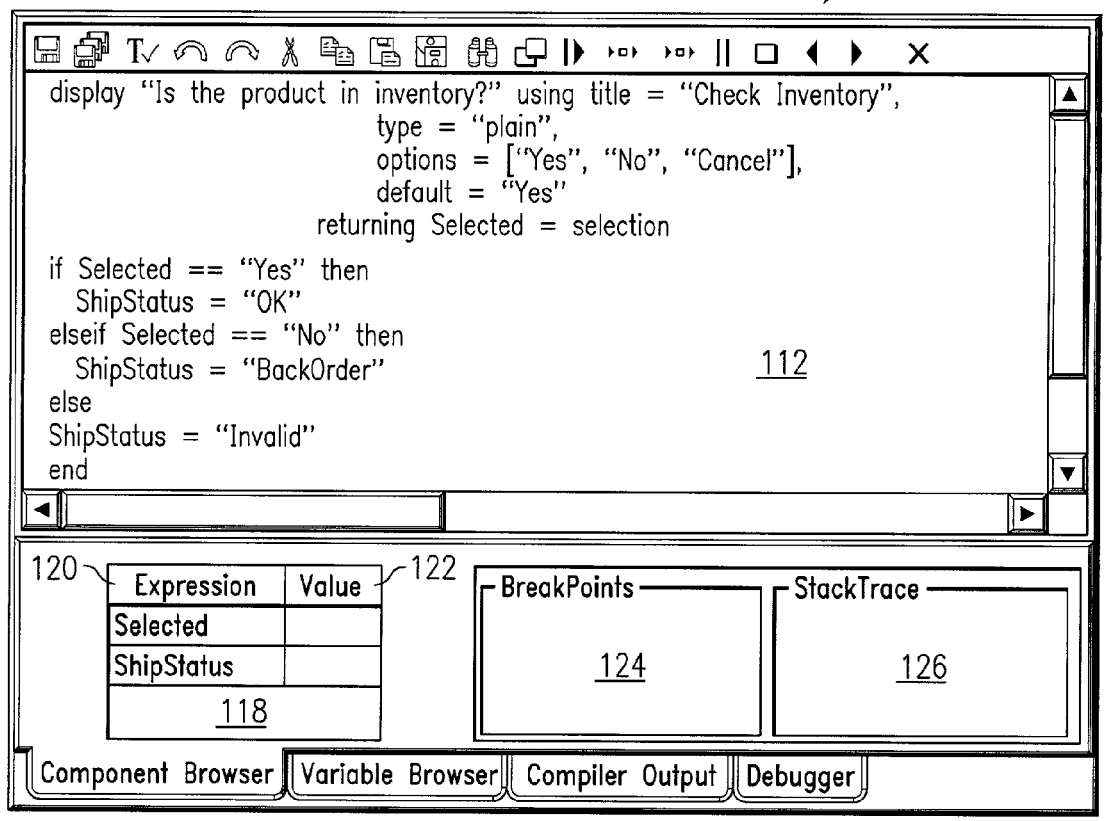
FIG. 9 illustrates an example screen for debugging a script.

FIG. 9 illustrates an example screen 102 that includes a watch expression panel 118. Watch expression panel 118 includes an expression column 120 and a value column 122. Watch expression panel 118 allows a user to add, inspect, or modify the values of variables or expressions during the execution of a script 88. A requested expression may be entered into expression column 120. The debugger evaluates each expression entered into expression column 120 and displays the value for the expression to the value column 122. The values of the expressions may be changed in order to test different conditions. The values may be requested after the execution of each script statement.

A breakpoint panel 124 allows a user to suspend the execution of script 88 when an event occurs. Breakpoints may be set for a specified statement of a script 88. The breakpoints are listed in the breakpoint panel 124 as the debugger runs through script 88. Breakpoints may be set for a specified statement of a script 88. Stack trace panel 126 displays the stack trace of a script 88 currently being executed in order to detect the current state of execution.

Introspection Module

Figure 10:
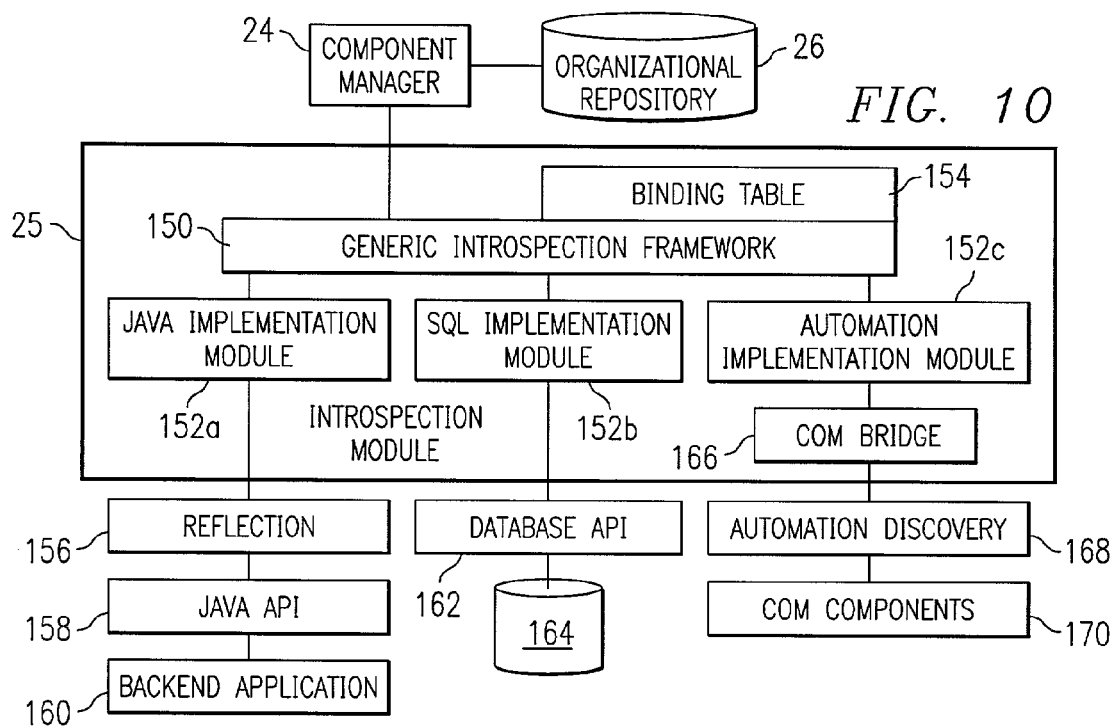
FIG. 10 is a block diagram of an example introspection module.

FIG. 10 is a block diagram of an example introspection module 25 that may be used to access data or applications based on any of one or more implementations, or programming languages, such as JAVA, SQL, or AUTOMATION. Component manager 24 uses introspection module 25 to translate implementation-specific components, for example, JAVA classes, SQL tables, or AUTOMATION components, into generic components by binding the implementation-specific components with corresponding generic components. The generic components may be included in catalog 66 of the organizational repository 26. Other modules such as process designer 20, debugger 23, or component manager 24 may use the generic components of catalog 66. An example screen displaying the contents of catalog 66 is described with reference to FIG. 12.

Generic methods and attributes may also be bound to implementation-specific methods and attributes. TABLE 2 illustrates examples of generic components, methods, and attributes that may be bound to implementation-specific components, methods, and attributes.

TABLE 2

| | Implementation-specific | | |
| --- | --- | --- | --- |
| Generic | JAVA | SQL | AUTOMATION |
| Component | Class | SQL Table | Component |
| Method | Method | None | Method |
| Attribute | Attribute | Field | Attribute |

Introspection module 25 translates implementation-specific components into generic components that may be used by other modules. A component may be translated by binding a generic component identifier, for example, component 1, with an implementation-specific component identifier, for example, JAVA class 1. These bindings may be stored in a binding table 154. Component manager 24 may synchronize binding table 154 with organizational repository 26. Binding table 154 may be stored locally in the file system of the developer.

Introspection module 25 may include a generic introspection framework 150 and one or more implementation modules 152. Generic introspection framework 150 identifies the implementation associated with a component requested by a module, and then selects the appropriate implementation module 152 to retrieve the component. According to one embodiment, there may be logically one different implementation by technology or programming language. When defining a new implementation, the designer selects from a list of available implementation modules.

Implementation modules 152 include procedures that are used to access application programming interfaces (API) associated with any of one or more implementations. Implementation modules 152 may also map implementation-specific components to generic components, and send the mapping to generic introspection framework 150. In the illustrated example, implementation modules 152 include a JAVA implementation module 152a, an SQL implementation module 152b, and an AUTOMATION implementation module 152c. Implementation modules 152 associated with any suitable implementation, however, may be used. For example, implementation modules 152 may be used to access implementation-specific components associated with, for example, ENTERPRISE JAVABEANS (EJB), CORBA, REMOTE METHOD INVOCATION (RMI), XML Schemas, Web Services, OR JAVA NAMING AND DIRECTORY INTERFACE (JNDI).

In the illustrated example, JAVA implementation module 152a uses a reflection module 156 to retrieve components from a JAVA API 158. Reflection module 156 is a feature of JAVA that allows an executing JAVA application to examine, or introspect, upon itself, and manipulate internal properties of the application or JAVA class. For example, a JAVA class may retrieve the names of the members of the JAVA class. Reflection module 156 may be used to determine the structure of JAVA components in JAVA API 158. JAVA API 158 may include an interface that provides access to a back-end application 162 that is based on a JAVA programming language. JAVA API 158 may be provided by the vendor of the back-end application 162.

In the illustrated example, SQL implementation module 152b is used to access a database 164. In SQL implementation module 152b, an API such as JAVA DATABASE CONNECTIVITY (JDBC) that is implemented by each database vendor may be used. JDBC is a framework proposed by SUN MICROSYSTEMS INC. to access information in a database. This may provide an easy way to access a database from JAVA. (FUEGO'S native platform). By having an implementation of a JDBC driver to access a database vendor, tables and stored procedures may be introspected and exposed in the generic component view that abstracts the user from the underlying technical details.

In the illustrated example, AUTOMATION implementation module 152c may use a COM bridge 166 to access a COM runtime API 168 that uses COM AUTOMATION introspection 168. In the case of AUTOMATION, COM BRIDGE may be used to reach the COM AUTOMATION component that may be running in a remote machine. By deploying COM BRIDGE in the remote machine, the COM component may be introspected and executed. To introspect a COM component, the COM BRIDGE may use COM runtime libraries that allow for discovery of the COM AUTOMATION component structure. This structure, which may describe methods, attributes, etc., is sent back to the AUTOMATION implementation module 152c, which in turn returns the generic component view to generic introspection framework ISO. In turn, COM BRIDGE executes COM components at runtime based on the information cataloged after component introspection. AUTOMATION discovery 168 may be used to retrieve one or more COM components 170.

Figure 11:
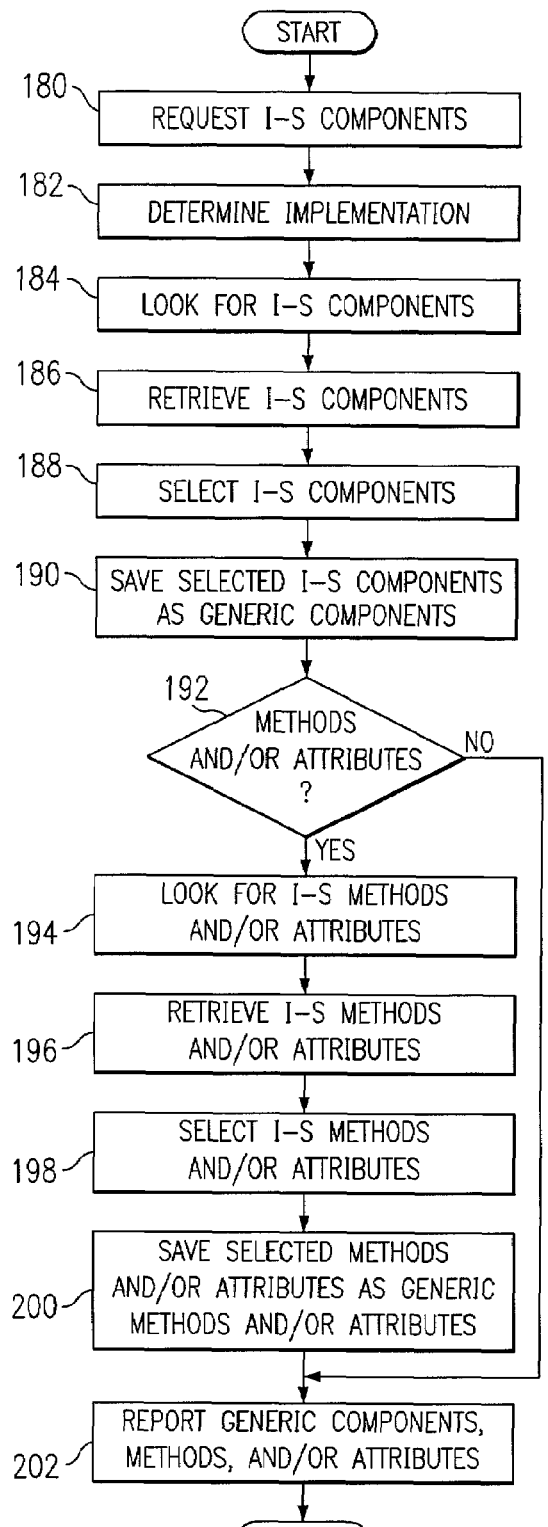
FIG. 11 is a flowchart illustrating an example method of an introspection process.

FIG. 11 is a flowchart illustrating an example of a method for generating generic components, methods, and attributes. For purposes of illustration, JAVA is used as the implementation. Other suitable implementations, however, of course, may be used.

Figure 13:
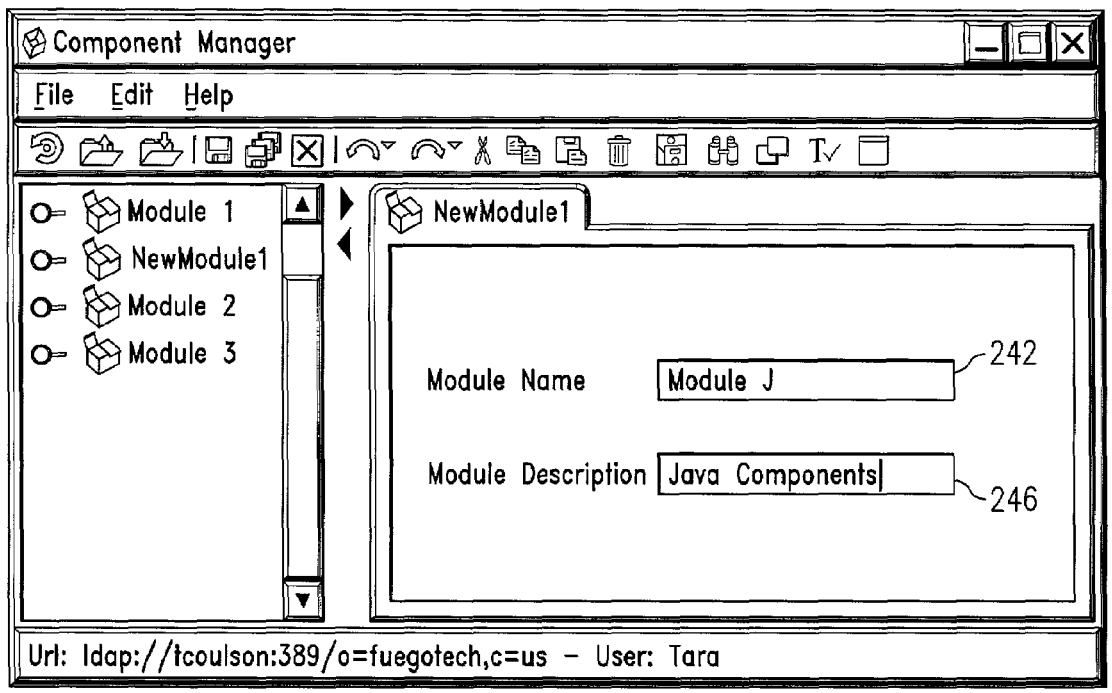
FIG. 13 illustrates an example screen for configuring a module of a component manager.

The method begins at step 180, where component manager 24 requests the introspection of an implementation-specific API composed of implementation-specific (I-S) components. The components may be introspected by specifying an implementation identifier corresponding to the implementation-specific components. An implementation identifier may include, for example, a JAVA package identifier to request JAVA implementation-specific components. FIG. 13 is for module definition.

Introspection module 25 determines the implementation of the requested implementation-specific components and couples the appropriate implementation module 152 at step 182. In the illustrated example, JAVA implementation module 152a is the appropriate implementation module 152. Implementation module 152 accesses the corresponding implementation to introspect a target API.

Implementation module 152 looks for the implementation-specific components at step 184 using its own introspection mechanism (that is, reflection in JAVA, according to one example). In the illustrated example, reflection module 156 identifies the JAVA implementation-specific components of a JAVA API 158. The requested implementation-specific components are retrieved at step 186. In the illustrated example, JAVA classes of the requested JAVA package are retrieved. Implementation-specific components are selected at step 188. The components may be selected by a user. An example screen for selecting implementation-specific components are described with reference to FIG. 14.

The selected implementation-specific components are saved as generic components at step 190. The selected implementation-specific components may be saved as generic components by creating an entry in binding table 154 that associates the selected implementation-specific components with generic components. By saving implementation-specific components as generic components, modules such as process designer 20 may readily access the generic components without performing implementation-specific procedures.

At step 192, generic methods and/or attributes may be generated. If generic methods and/or attributes are to be generated, the method proceeds to step 194. At step 194, the appropriate implementation API looks for implementation-specific methods and/or attributes associated with the requested implementation-specific component. In the illustrated example, reflection module 156 looks for the implementation-specific methods and/or attributes associated with the requested JAVA class in JAVA API 158.

The implementation API retrieves the implementation-specific methods and/or attributes at step 196. In the illustrated example, JAVA methods and/or attributes are retrieved. Implementation-specific methods and/or attributes are selected at step 198. The methods may be selected by a user. An example screen for selecting methods and/or attributes is described with reference to FIG. 15. The selected methods and/or attributes are saved as generic methods and/or attributes at step 200. The selected methods and/or attributes may be saved as generic methods and/or attributes by creating an entry in binding table 154 that associates the selected methods with the corresponding generic methods and the same for the attributes. The method then proceeds to step 202.

If generic methods are not to be generated at step 192, the method proceeds directly to step 202. At step 202, the generic components and methods and/or attributes are reported. After reporting the generic components, methods and/or attributes, the method terminates.

Figure 12:
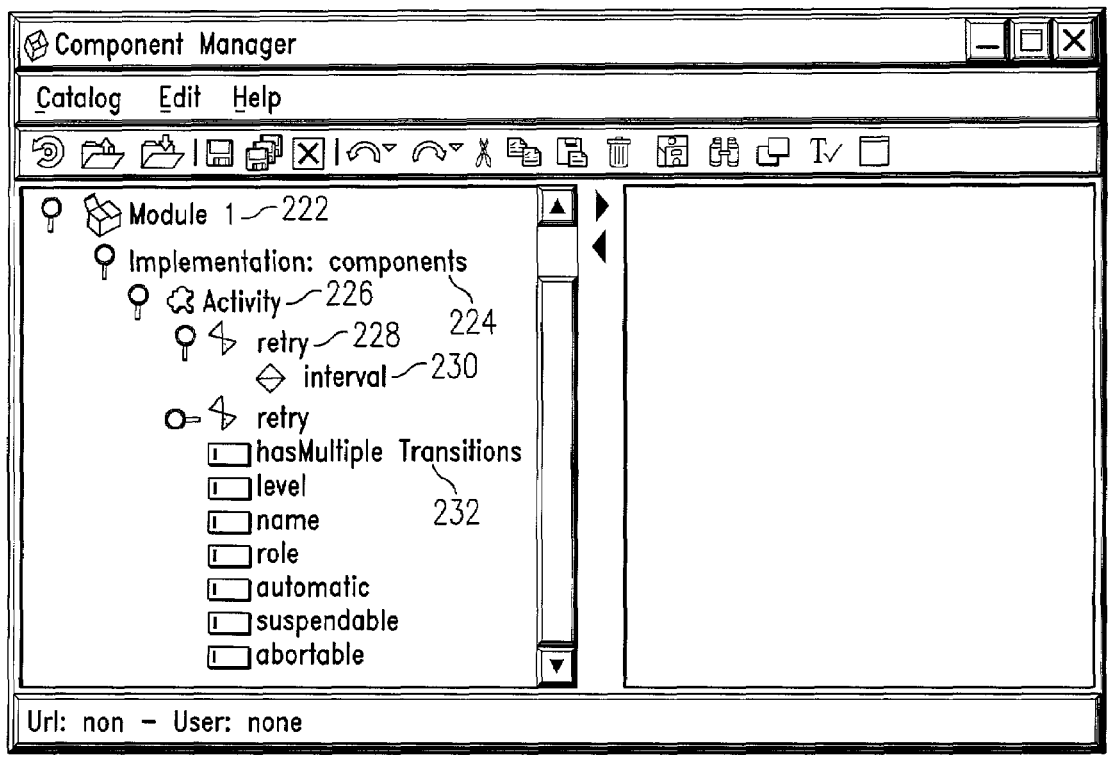
FIG. 12 illustrates an example screen for displaying a catalog of a catalog manager.

FIG. 12 illustrates an example screen 220 for displaying catalog 66 managed by component manager 24. Catalog 66 may include a module 222, an implementation identifier 224, a component 226, a method 228, a property 230, and an attribute 232. Properties may be considered the same as attributes. There is only a semantic difference. Modules 222 comprise sets of components 226. Implementation identifier 224 identifies a directory structure where components 226 are located. Components 226 may be associated with methods 228, properties 230, and attributes 232. Methods 228 comprises object-based functions that may be called to perform an action for a specific component. A property 230 may comprise dynamic information that components 226 may use to define their data model. Module 222 may be associated with a folder that comprises an XML file when the components of module 222 are saved. There may be one XML file per component.

FIG. 13 illustrates an example screen 240 for configuring a catalog of component manager 24. A module 222 may be added by providing a module name 242 and a module description 246. Modules 222 may be used to logically group components that are used for specific purposes.

Figure 14:
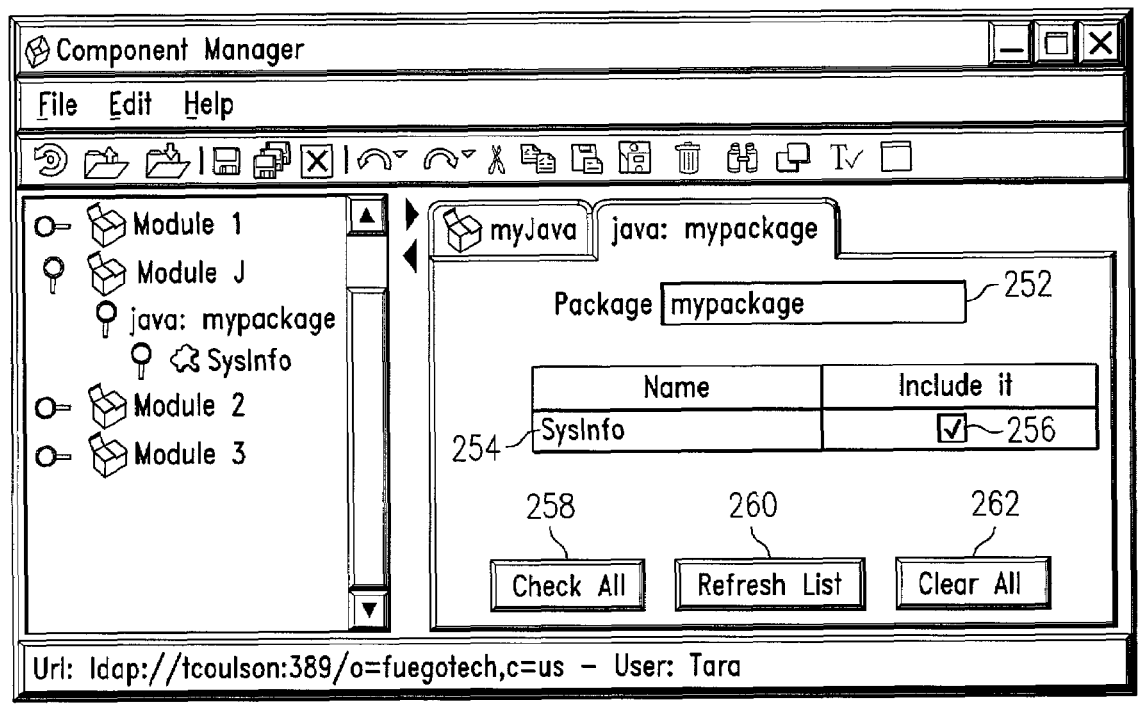
FIG. 14 illustrates an example screen for adding one or more components to an implementation in a module.

FIG. 14 illustrates an example screen 250 for adding one or more components 226 to catalog 66. In the illustrated example, a JAVA package is identified by providing a package identifier 252 for a JAVA package. Components 226 available in the identified implementation are displayed in window 254. Components 226 may be added to catalog 66 by checking a box 256 labeled "include it." A check-all button 258 may be used to select all components 226 displayed in window 254. A refresh list button 260 may be used to load available specific components and list them for a selection. A clear-all button 262 may be used to clear boxes 256.

Figure 15:
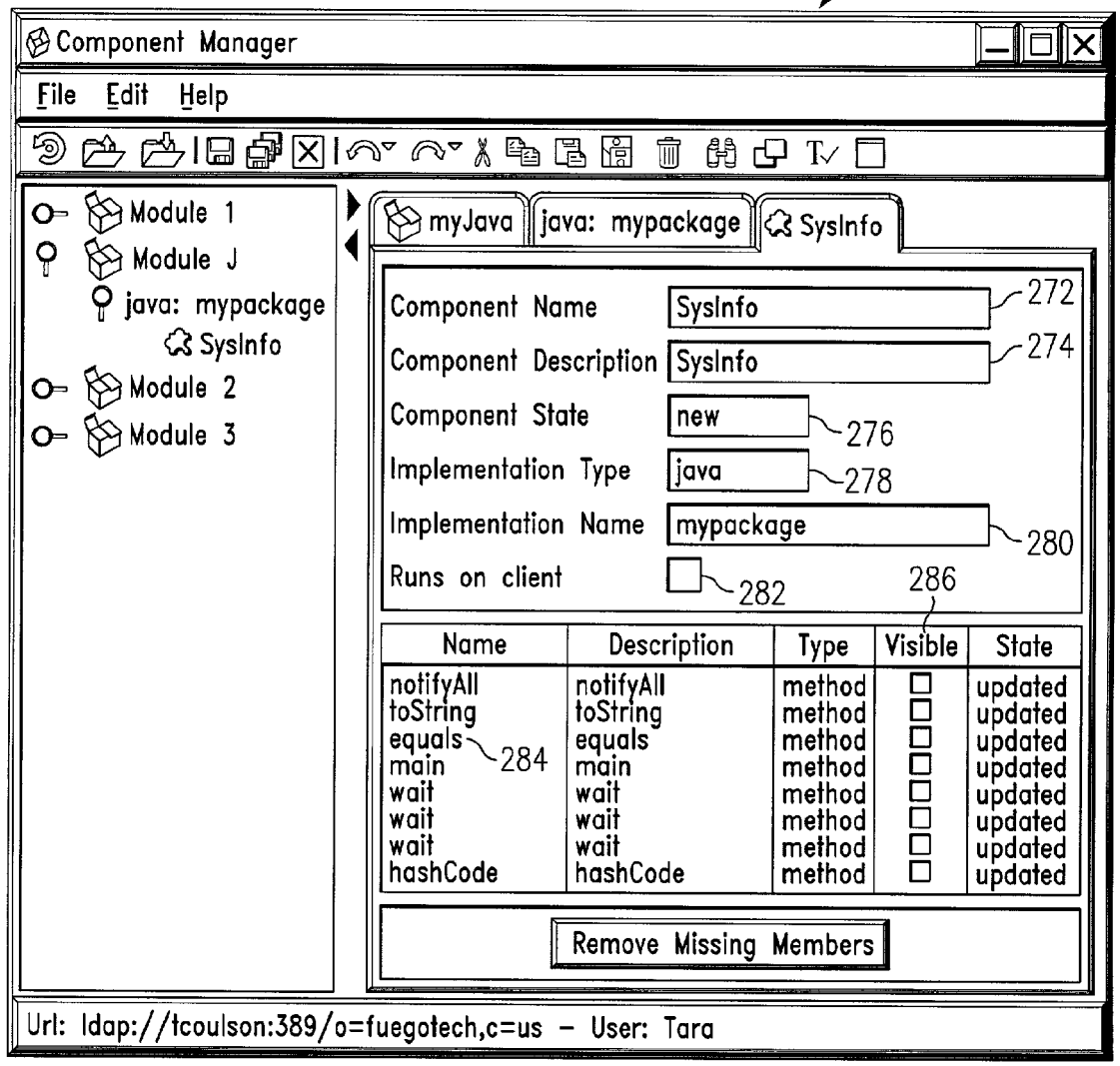
FIG. 15 illustrates an example screen for adding one or more methods to a component located into a module of a catalogue.

FIG. 15 illustrates an example screen 270 for adding one or more methods to catalog 66. Screen 270 displays a component name 272, a component description 274, a component state 276, an implementation type 278, an implementation name 280, and an indication 282 on whether the component runs on a client side or on an engine side. Methods 228 associated with the component 226 are displayed in window 284. Methods 228 may be selected to be added to catalog 66 by checking a box 286 labeled "visible." The same concept may apply for component attributes.

According to one embodiment, identifiers that may be used to locate and introspect components are listed in TABLE 3:

TABLE 3

| Technology | Technology Identifier |
| --- | --- |
| AUTOMATION | AUTOMATION GUID |
| SQL | Database vendor connection properties |
| EJB | Application server vendor content properties |
| JNDI | Directory server connection properties |

Analytical Data Generation

Figure 16:
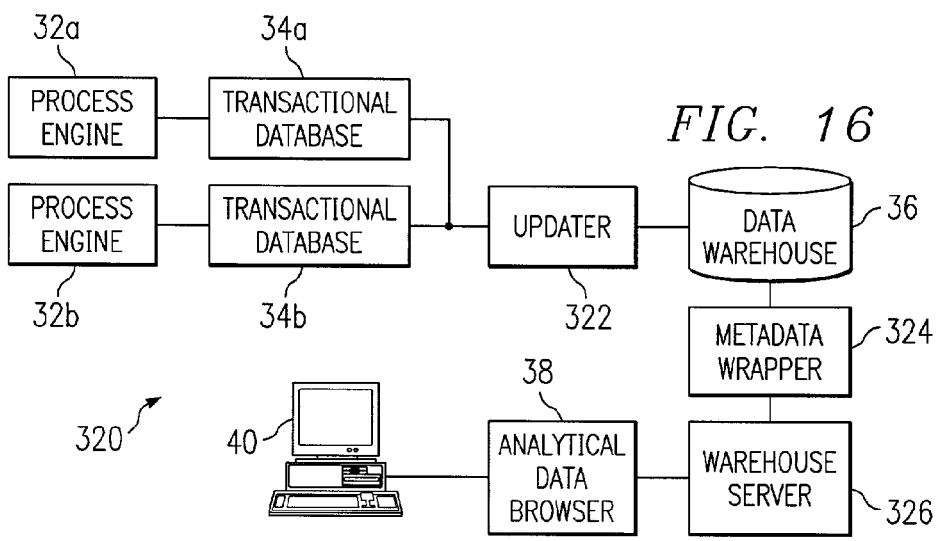
FIG. 16 is a block diagram of an example system for analyzing process transactional data.

FIG. 16 is a block diagram of an example system 320 for analyzing transactional data describing instances of business processes 52. System 320 includes one or more process engines 32 that execute instances of business processes 78. Process engines 32 store transactional data about the instances in transactional databases 34.

An updater 322 retrieves data from transactional databases 34 and stores the data in data warehouse 36. Data may be updated in any suitable manner. For example, a process engine 32 may instruct updater 322 to update data warehouse 36. If multiple process engines 32 are running, the process engines 32 may be synchronized to update data warehouse 36. For example, data warehouse 36 may be locked while a process engine 32 is updating data warehouse 36. A process engine 32 may attempt to perform an update by attempting to lock data warehouse 36. If data warehouse 36 is already locked, process engine 32 cannot obtain a lock to update data. If data warehouse 36 is not locked, process engine 32 acquires a lock and updates data warehouse 36. Data warehouse 36 may consolidate information from multiple process engines 32 of the enterprise in order to provide information to the management of an organization.

A recovery process may be performed before data is updated in order to coordinate data received from multiple process engines 32 and avoid inconsistencies due to problems occurring when data is transferred from transactional database 34 to data warehouse 36. The recovery process checks whether an update execution was not properly completed. If the recovery process detects a failure, then the process may attempt to execute the update again. The update execution may be considered as an impotent operation if the update execution did not finish properly.

Data may be updated at any suitable time. For example, data may be updated when instructed by process engine 32 or by execution console 33. Alternatively, data may be automatically periodically updated. Periodic updating may be controlled by process engines 32.

A warehouse server 326 accesses and organizes data in data warehouse 36. Warehouse server 326 may use a metadata wrapper 324 that has information about the structure of data warehouse 36 to access the right data. Warehouse server 326 may generate n-dimensional cubes to organize and display data in an understandable way. The dimensions of the cubes represent, for example, organizational data, such as an organizational unit, and measures of the cubes represent transactional data such as number of completed instances. Warehouse server 326 may comprise, for example, an on-line analytical processing (OLAP) server. If data warehouse 36 comprises an OLAP data warehouse, any suitable OLAP server may be used to access data warehouse 36.

Measures may be filtered by dimensions to obtain more accurate analytical reports. In the context of process measurements, measures may be identified with, for example, the number of instances in activities 80, the number of instances completed by business process 78, the execution time of an instance of an activity 80, or the average wait time for an instance of an activity 80. Dimensions may be associated with, for example, organizational units, roles, users, or time. Filtering the measures by the dimensions provides for a focused search in a large amount of data. Warehouse server 326 manages the building of the cubes composed of measures and dimensions that allow for viewing, filtering and analysis with the analytical data browser 38.

Analytical data browser 38 interprets data organized by warehouse server 326. For example, analytical data browser 38 may be used to interpret the cubes generated by warehouse server 326. Analytical data browser 38 may comprise, for example, an OLAP browser. Computer 40 may be used to display the information interpreted by analytical data browser 38.

According to one embodiment, analytical data browser 38 may provide the following functionality:
  Calculations and modeling applied across dimensions, through hierarchies and/or across members;
  Trend analysis over sequential time periods;
  Historical and projected data analysis in hypothetical data model scenarios;
  Slicing subsets for on-screen viewing;
  Drill-down to deeper levels of consolidation;
  Reach-through to underlying detailed data; and
  Rotation to new dimensional comparisons in the viewing area.

Figure 17:
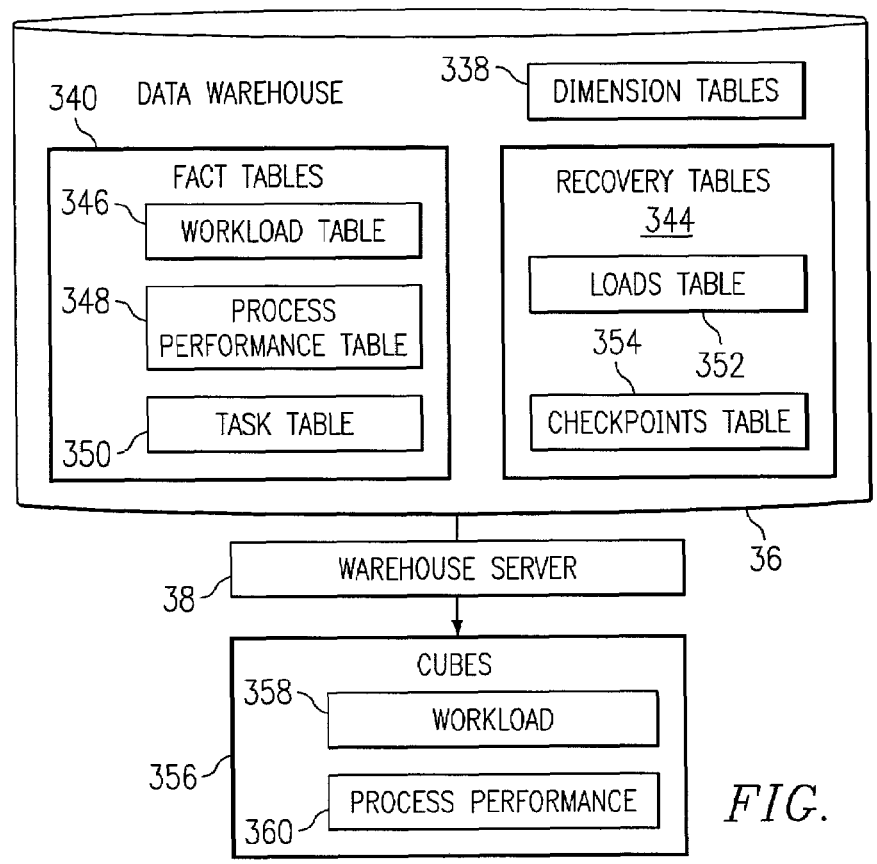
FIG. 17 is a block diagram illustrating an example data warehouse of FIG. 1.

FIG. 17 is a block diagram illustrating an example of data warehouse 36 of FIG. 16. In the context of system 10, data warehouse 36 stores transactional data about instances of business processes 78, and may include dimension tables 338, fact tables 340, and recovery tables 344. Fact tables 340 include statistical data about instances of business processes 78, and dimension tables 338 describe the measures used to organize the statistical data. Dimension tables 338 may describe, for example, roles, users, organizational units, organizations, business processes 78, and activities 80.

Fact tables 340 may include, for example, a workload table 346, a process performance table 348, and a task table 350. Workload table 346 describes a snapshot of statistical data for activities 80 executing at a specific time. For example, the statistical data may include the information described in TABLE 4.

TABLE 4

| Snapshot Time | time of the snapshot |
|---|---|
| Activity Identifier | activity running |
| Organizational Unit Identifier | organizational unit where the activity is running |
| Role Identifier | role executing the activity |
| User Identifier | user running the activity (the user belongs to the identified role) |
| Activity Origin | child activity belonging to a subprocess created by the running activity |
| Organizational Unit Origin | organizational unit where the child activity belongs |
| Activity Waiting | parent activity which created a subprocess that includes the running activity |
| Organizational Unit Identifier Waiting | organizational unit where the parent activity belongs |
| Quantity | quantity of instances running in the activity |
| Average Task Time | average time since the instance reached the current activity |
| Average Process Time | average execution time for the activity since the process began |

Process performance table 348 includes statistical data about completed activities 80. The statistical data may include, for example, the information described in TABLE 5.

TABLE 5

| Activity Identifier | Completed activity |
|---|---|
| Role Identifier | role that executed the activity |
| User Identifier | user who ran the activity |
| Organizational Unit | Organizational unit where the |

TABLE 5-continued

| | |
|---|---|
| Identifier | activity ran |
| Completion Time | time when the activity ended |
| Task Time | Execution time of the activity |

Task table 350 includes statistical data about completed instances. The statistical data may include, for example, the information described in TABLE 6.

TABLE 6

| | |
|---|---|
| Process Identifier | completed process |
| Organizational Unit Identifier | organizational unit where the activity is running |
| Completion Time | time when the process ended |
| Task Time | execution time of the process |

Recovery tables 344 are used to perform recovery procedures to coordinate data updated by multiple process engines 32. According to one example, one process engine 32 updates data warehouse 36 at a time. The updates of all process engines 32 represent a global update that describes the information at each process engine 32 at a specific time. Recovery tables 344 include a loads table 352 and a checkpoints table 354. Loads table 352 includes information about global updates, such as the time of a global update. Checkpoints table 354 includes information about the status of an update done by each process engine 32. This information may be used to determine if a process engine 32 has failed to update data warehouse, resulting in an incomplete global update.

Warehouse server 38 generates cubes 356 that organize data stored in data warehouse 36. Cubes 356 may have dimensions and measures. Dimensions represent categories used to organize data. Some dimensions may represent categories measured or evaluated using the measures. For example, a dimension may represent organizational units evaluated by profits, which are in turn represented by a measure. Combinations of dimensions may include, for example:

date and business process
 date and users
 business process and roles
 activities and times
 organizational unit and date Cubes 356 may rank dimensions and elements within the dimensions into a hierarchy. For example, a date dimension may have a hierarchy that includes years, quarters, months, and days, and a process dimension may have a hierarchy that includes organizational units and activities. The date dimension may be ranked higher than the process dimension. Accordingly, a cube 356 may organize information by years, quarters, months, days, organizational units, and activities.

Measures represent values that may be organized according to the dimensions. Measures may be used to measure and evaluate dimensions. For example, measures may represent business indicators used to measure and evaluate an organizational unit represented by a dimension, which may allow a user to determine business trends. Cubes 356 for an organization focused on sales and might feature dimensions such as products, customers, and country, and measures such as costs, sales, and profits. Users may filter each measure by different dimensions to obtain the different views of data.

Analytical Data Browser

Analytical data browser 38 provides for analysis based on any combination of dimensions and measures. For example, a user may begin with an analysis determining the evolution of a sales margin over the last three months. If one month has a low value, the user may investigate the sold units, sales, and cost. If the reduction is a result of a smaller number of units sold, the user may examine if this trend is attributable to different products or sales regions.

Analytical data browser 38 provides for analysis at multiple levels of detail. For example, a date dimension may be analyzed at different levels of detail. An executive may view the performance of a business during an entire year, but may want to check the performance for the first quarter. To do this, the executive drills down into the date dimension to see the information split into quarters. Performance may be viewed at a monthly, weekly, or daily level. Analytical data browser 38 may provide the ability to spot a problem that may have occurred, discover its duration, and even its cause.

Information may be arranged into hierarchies, which may facilitate drilling. Drilling up presents a higher-level hierarchy, and drilling down presents a lower-level hierarchy. A user may drill to a highest level hierarchy or a lowest level hierarchy without going through intermediate levels.

A workload cube 358 describes a snapshot of executing instances of business processes 78. Workload cube 358 may include the dimensions described in TABLE 7.

TABLE 7

| Dimensions | Definition |
|---|---|
| Date | Date the snapshot of business process captured. |
| Process (Hierarchy) | Hierarchical filter that allows selection of process (top level), organizational unit (2nd level), activity (3rd level). |
| Origin | Only valid for subflow process activities. Parent or originating process of activity being analyzed in child or subflow process. |
| Waiting | Activity that is waiting for business process to complete. |
| Roles | Organizational roles defined for business process. |
| Users | Users defined for business process. |
| Time | Time the snapshot of business process captured. |

The measures for workload cube 358 may include the measures described in TABLE 8.

TABLE 8

| Measures | Definition |
|---|---|
| Quantity Accumulator | Internal measure. |
| Task Wait Average | Average time instances remain at an activity before being routed to a next activity. |
| Process Wait Average | Cumulative time an instance has been running. Instance average life time so far in the process. |
| Snapshots | Number of times the updater transferred information from process engines to data warehouse. |
| Quantity | Total number of instances at a given moment. |

Process performance cube 360 describes work performed on each business process 78 by a user. Process performance cube 360 reflects the time taken to complete activities 80 within and between business process instances. The dimensions may include the dimensions described in TABLE 9.

TABLE 9

| Dimensions | Definition |
| --- | --- |
| Date | Date the activity or instance completed execution. |
| Process (Hierarchy) | Hierarchical filter that allows selection of process (top level), organizational unit (2nd level), activity (3rd level). |
| Time | Time the activity or instance completed execution. |
| Roles | Organizational roles defined for the business process. |
| Users | Users defined for the business process. |

Measures may include the measures described in TABLE 10.

TABLE 10

| Measures | Definition |
| --- | --- |
| Work | Number of instances that successfully routed from this activity to a next activity. |
| Average Time Activity | Average activity execution time to successfully route an instance to a next activity. |
| Average Time Process | Average instance execution time or average time that an instance takes to go from the beginning to the end of a business process. |
| Process Completed | Total number of instances that were processed by a specific business process. This is process throughput. |

Figure 18:
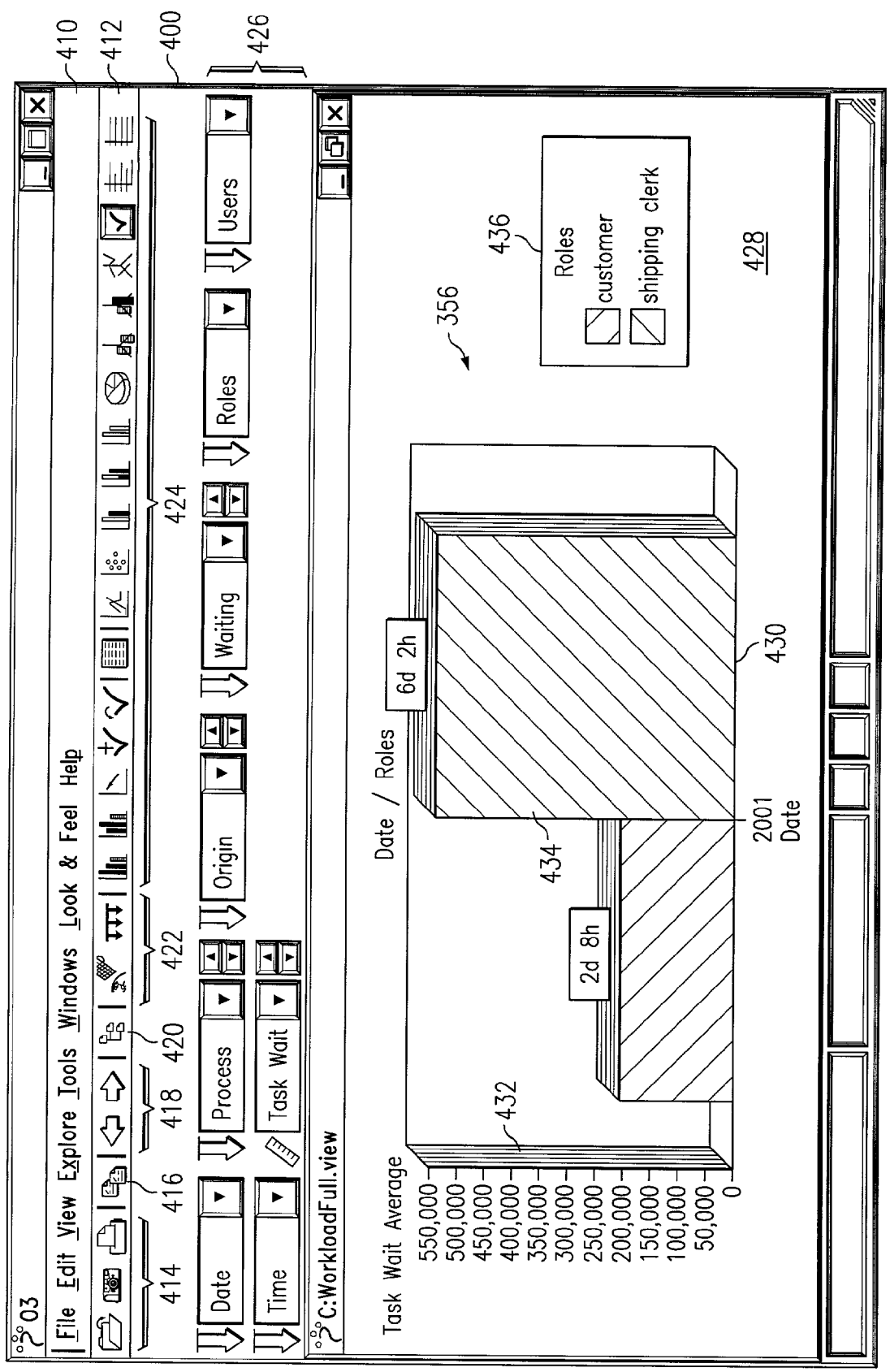
FIG. 18 illustrates an example screen for generating a cube.

FIG. 18 illustrates an example screen 400 for viewing cube 356 of FIG. 17. According to one embodiment of the invention, an O3 OLAP browser from IDEASOFT, INC. may be used to view cube 356. Screen 400 includes menus 410 that may be used to perform operations to view cube 356. Buttons 412 may be used to perform operations that are performed by menus 410. File buttons 414 may be used to open, create an image of, or print a cube 356. A copy button 416 may be used to copy all or a portion of a cube 356. Forward and backward buttons 418 may be used to view next or preceding views of cubes 356. Buttons 420 may be used to turn the explorer panel on or off, and buttons 422 may be used to return to the initial view or display the browser's original view.

View buttons 424 may be used to select how to view a cube 356. Views in various OLAP browsers may include, for example: a spreadsheet, a plot diagram, a scatter plot diagram, three-dimensional grouped bars, three-dimensional stacking bars, three-dimensional mono series bars, a three-dimensional pie diagram, bars, pyramids, a tape, two measures, and an inverted axis. Although buttons 412 are illustrated, additional or alternative buttons 412 may be used.

A dimension and measures bar 426 may be used to select the dimensions and measures of cube 356. Dimensions and measures may be distinguished by any suitable manner, for example, font format or placement. The dimensions and measures may be organized in categories, for example, by date, process, origin, waiting, roles, users, time, and task waiting.

A window 428 displays a generated cube 356. In the illustrated example, cube 356 includes an x-axis 430 and a y-axis 432. A date dimension and a roles dimension have been selected for x-axis 430, and a task weight average measure has been selected for y-axis 432. Data 434 driven by a selected measure (task wait) and organized according to the dimensions of x-axis 430 and the measure of y-axis 432 is displayed. Window 428 includes a box 436 that describes a dimension used to organize and filter data 434. In the illustrated example, customer and shipping clerk roles are used to organize or visualize data 434 in a desired manner. Although an example screen 400 is illustrated, screen 400 may have any arrangement of elements suitable for viewing cube 356.

Figure 19:
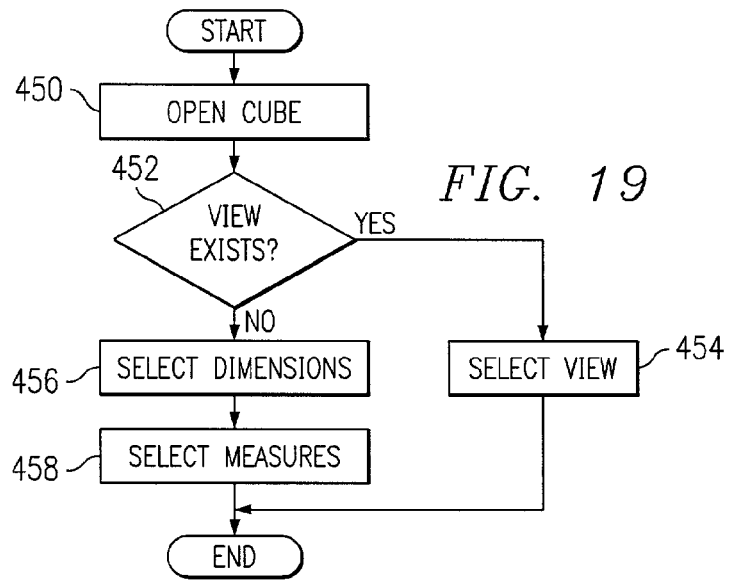
FIG. 19 is a flowchart illustrating an example of a method for generating a cube.

FIG. 19 is a flowchart illustrating an example of a method for viewing, or visualizing, cube 356. The method begins at step 450, where cube 356 is opened. Cube 356 may be opened using an open file button 414 of screen 400. If a desired view exists at step 452, a view is selected at step 454. The view may be selected by using view buttons 424. If a desired view does not exist at step 452, a dimension that is to be used to organize data 434 is selected at step 456. In the illustrated example, the selected dimension comprises information presented by x-axis 430. To select the dimension, a user may drag a dimension list icon to x-axis 430. Any suitable number of dimensions may be used to achieve a desired filtering data level.

A measure is selected at step 458. A measure may be selected using a dimension and measure bar 426. In the illustrated example, the selected measure is used to describe information presented by y-axis 432. The measure may be selected by dragging a measure list icon to y-axis 432. Any suitable number of measures may be used. According to one example, only one measure may be used at a time. The measure may be filtered by more than one dimension.

Figure 20:
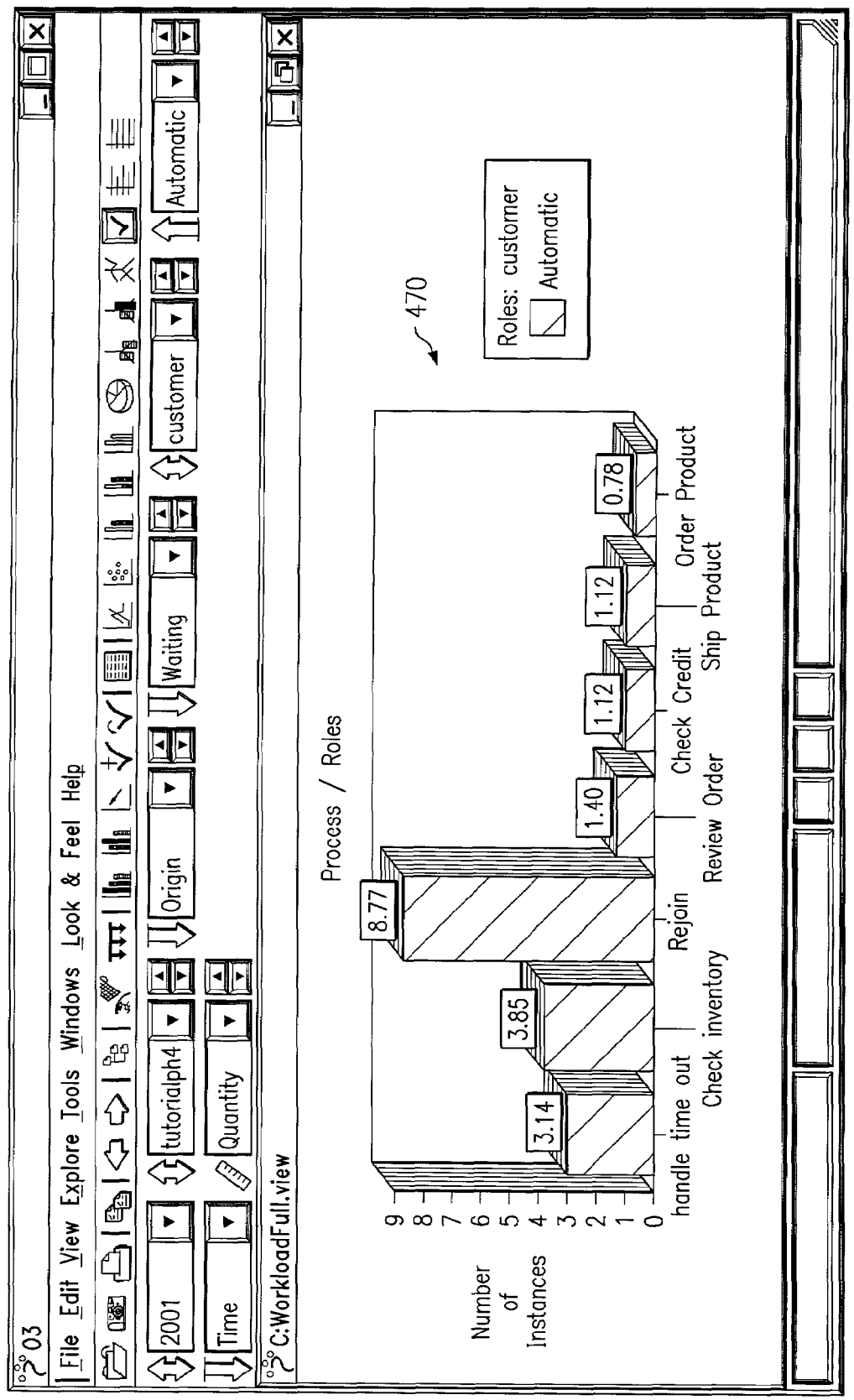
FIGS. 20 through 23 illustrate example cubes.

FIG. 20 illustrates an example cube 470. Cube 470 describes the total number of instances per activity at a specific time. A handle time out activity had 3.14 instances, a check inventory activity had 3.85 instances, a rejoin activity had 8.77 instances, and so forth.

Figure 21:
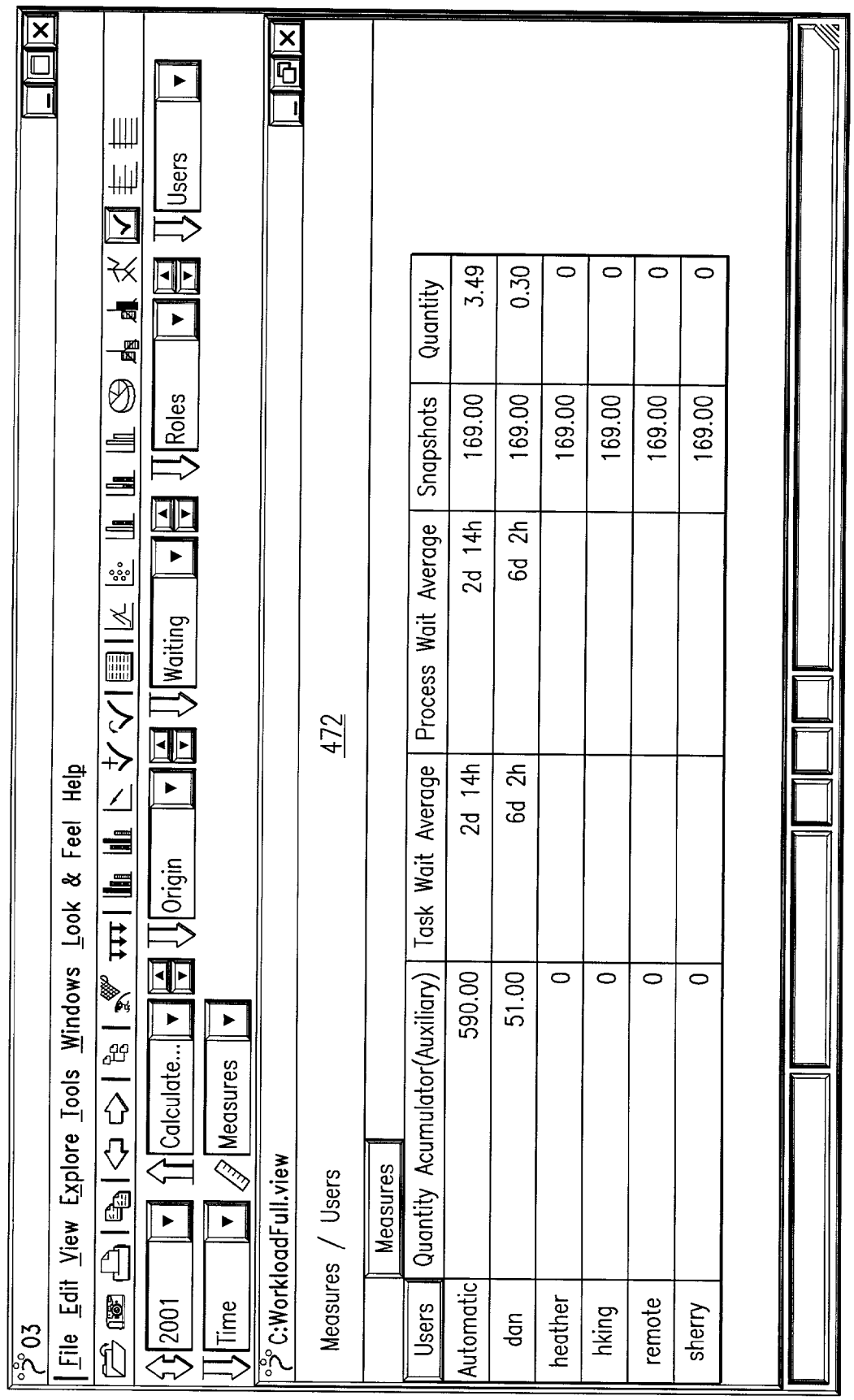

FIG. 21 illustrates an example cube 472. Cube 472 displays measures available in cube 472 and the time spent by each user in the process. The information is presented in a table format.

Figure 22:
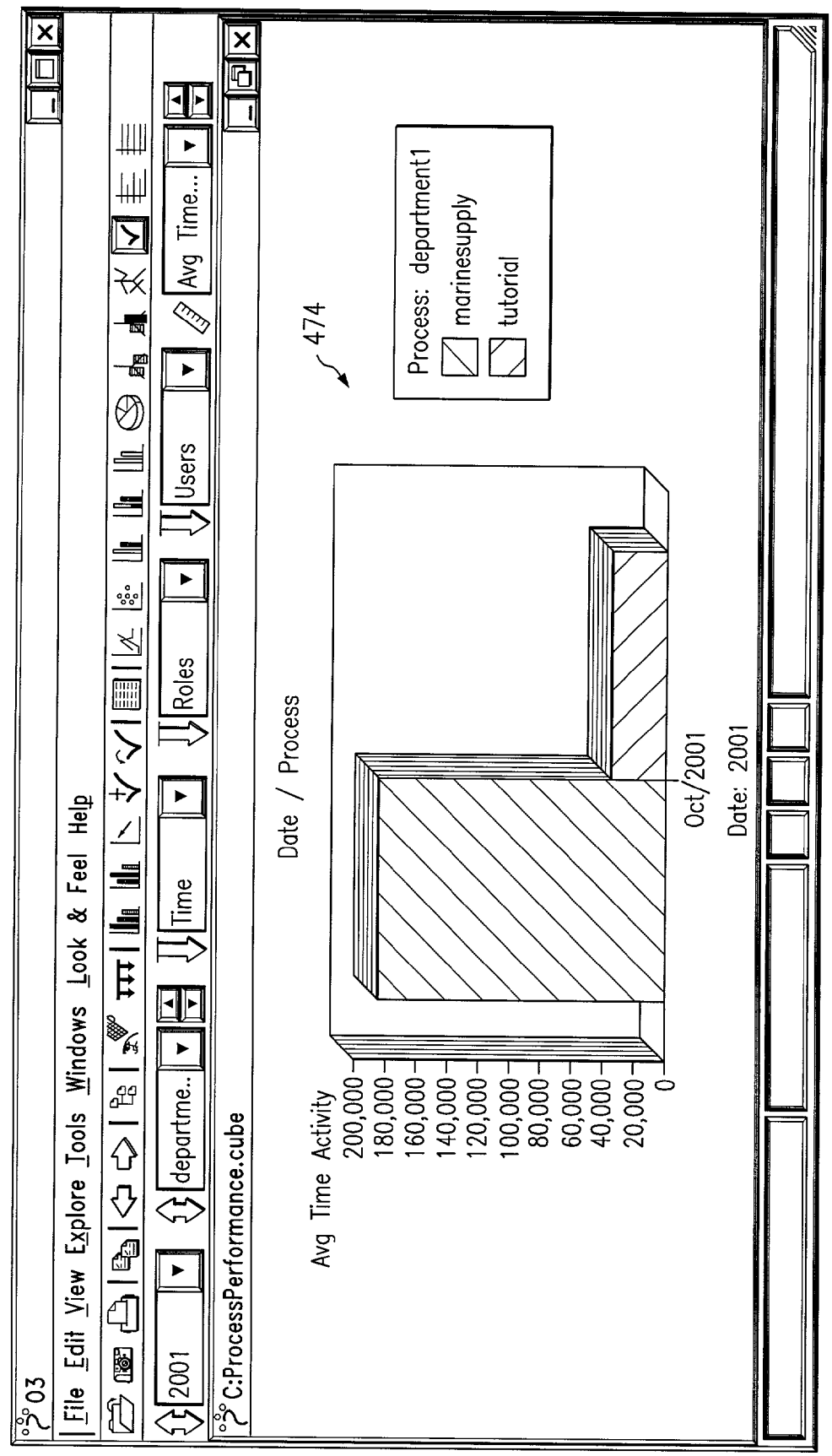

FIG. 22 is a cube 474 describing the average activity execution time to successfully route an instance to a next activity of a process for two processes, a marine supply process and a tutorial process.

Figure 23:
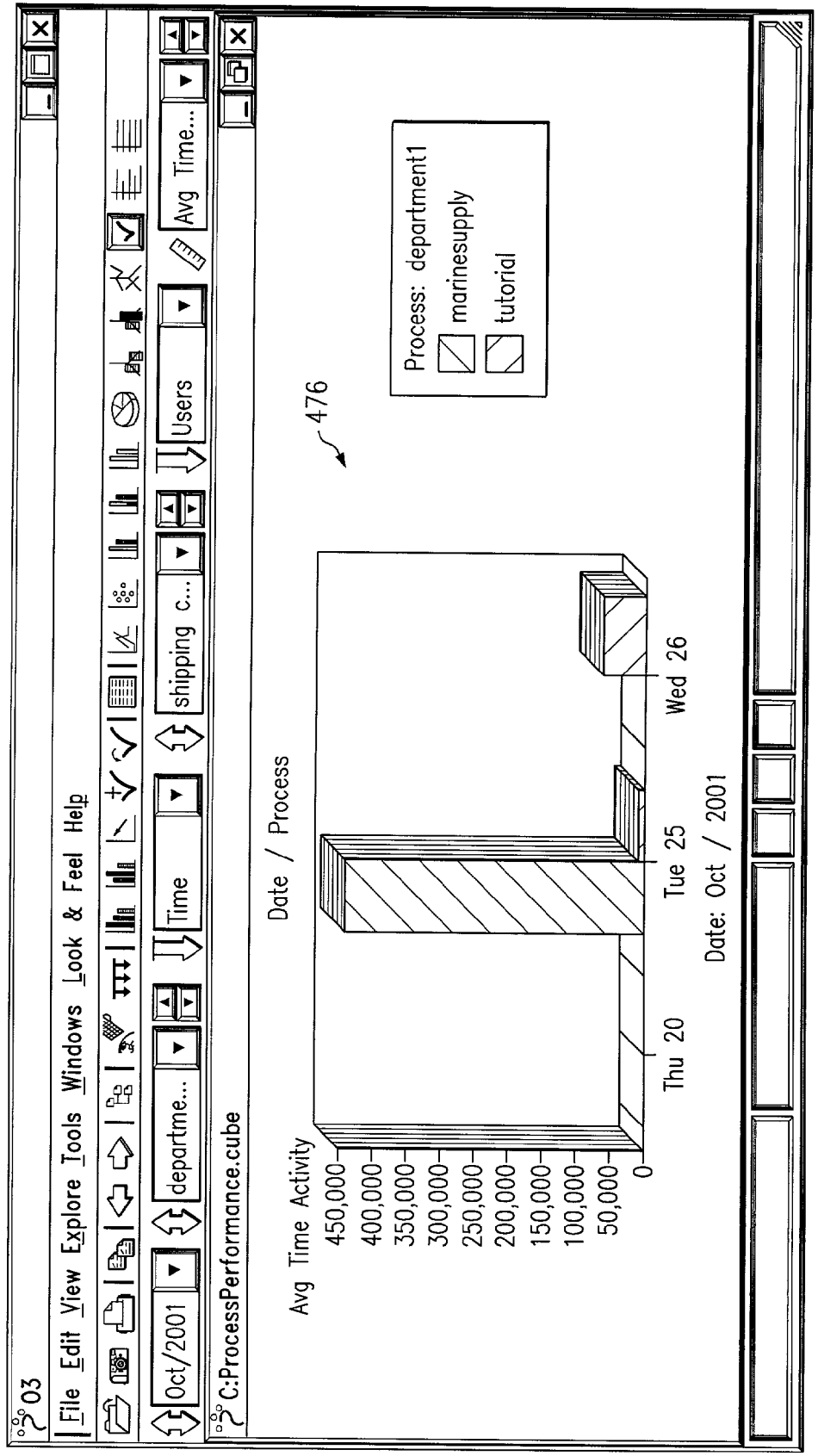

FIG. 23 illustrates a cube 476 that describes the execution time to successfully route an instance to a next activity of a process during a specific time period for the marine supply and tutorial processes. The marine supply process had the highest average time on Tuesday, Oct. 25, 2001.

System 10 may allow decision-makers of an organization to make informed, coordinated decisions in a rapid-fire environment. Analytical data browser 38 may provide coordination of information and decision-making that may move an organization forward in a unified fashion, as opposed to the more traditionally upward flow of information and downward flow of decisions.

Although an embodiment of the invention and its advantages are described in detail, a person skilled in the art could make various alterations, additions, and omissions without departing from the spirit and scope of the present invention as defined by the appended claims.

What is claimed is:

1. A system for designing and executing processes, said system comprising:

an introspection module in a generic introspection framework that automatically generates a catalog of generic components by introspecting a set of exposed application programming interfaces (APIs) of a plurality of heterogeneous applications created in different programming languages and transforming a plurality of implementation-specific components of said heterogeneous applications into the generic components of said catalog by binding identifiers of the generic components with identifiers of the implementation-specific components wherein the catalog contains a series of entries in a binding table automatically created during the introspection of the APIs, each entry representing a generic component which, when invoked, is bound to at least one of the implementation-specific components of said heterogeneous applications upon execution of the processes, the catalog further containing a module comprising the generic components associated with a folder comprising an XML file when the implementation-specific components are saved in the catalog as the generic components;

an implementation module that includes procedures to access the APIs and maps the implementation-specific components to the generic components by using its own introspection mechanism and sends the mapped implementation-specific components to the generic introspection framework;

a component manager coupled to the introspection module and configured to manage said catalog automatically generated by the introspection module by defining and organizing the generic components in said catalog; and a process designer coupled to the component manager and configured to:
  select at least one of the generic components from said catalog managed by the component manager; and
  graphically construct a process definition for the processes that includes a series of graphically represented activities linked by one or more transitions and associated with abstract roles specified for the activities wherein at least one activity of said process definition invokes the selected generic component from said catalog;
  whereby a single process is assembled from the implementation-specific components of the different programming languages, the implementation-specific components being compiled modular routines of the heterogeneous applications that have been previously created in different programming languages; and a repository for storing the process definition; and one or more process engines that execute said process definition to instantiate a process instance, wherein the process instance interacts with the plurality of heterogeneous applications by invoking the generic components in said catalog and wherein the process instance integrates the plurality of heterogeneous applications into the single process by invoking services from the plurality of heterogeneous applications during execution of the activities of said processes;

wherein during execution of the process instance, the compiled modular routines of the heterogeneous applications are invoked in order to complete the activities of said process instance.

2. The system of claim 1, further comprising an organizational repository that includes said catalog, organizational data and a plurality of processes generated by said process designer.

3. The system of claim 1, further comprising a debugger coupled to the process designer and configured to detect an error of the process definition.

4. The system of claim 1, further comprising:
a data warehouse coupled to the one or more process engines and configured to store transactional data describing the process instance; and
a data server coupled to the data configured to organize the transactional data.

5. The system of claim 1 wherein said implementation module is used to access implementation-specific components associated with at least one of: JAVA, Standard Query Language (SQL), Automation, Enterprise JavaBeans (EJB), CORBA, Remote Method Invocation (RMI), Extensible Markup Language (XML) schemas, Web Services and JAVA Naming and Directory Interface (JNDI).

6. The system of claim 1 wherein said process definition is published to the repository before being deployed to the one or more process engines.

7. The system of claim 1 wherein the entries of the catalog include metadata that describes at least one of the plurality of implementation-specific components.

8. The system of claim 1 wherein an activity of said process definition connects to a subprocess.

9. The system of claim 1 wherein said transitions indicate a next activity that is to be initiated after executing a previous activity.

10. The system of claim 1, further comprising:
a warehouse server that consolidates data from multiple process engines, wherein the warehouse server generates an N-dimensional cube to organize said data, wherein dimensions of the cube represent organizational data and measures of the cube represent transactional data of process instances.

11. The system of claim 10, wherein the measures of said cube are filtered by the dimensions of said cube in order to generate an analytical representation.

12. The system of claim 11 wherein the measures are identified with one or more of the following: a number of process instances in activities, the number of instances completed by said single process, execution time of a process instance and an average wait time for an activity.

13. The system of claim 11 wherein the dimensions are associated with one or more of the following: an organizational unit, a role, a user and time.

14. A computer implemented method for designing and executing processes, said method comprising:
  automatically generating a catalog of generic components in a generic introspection framework by introspecting a set of exposed application programming interfaces (APIs) of a plurality of heterogeneous applications implemented in multiple different programming languages and transforming implementation-specific components of the plurality of heterogeneous applications into the generic components of said catalog by binding identifiers of the generic components with identifiers of the implementation-specific components, wherein the catalog contains a series of entries in a binding table automatically created during the introspection of the APIs, each entry representing a generic component which, when invoked, is bound to at least one of the implementation-specific components of said heterogeneous applications upon execution of the processes, the catalog further containing a module comprising the generic components associated with a folder comprising an XML file when the implementation-specific components are saved in the catalog as the generic components;
  providing an implementation module that includes procedures to access the APIs and maps the implementation-specific components to the generic components by using its own introspection mechanism and sends the mapped implementation-specific components to the generic introspection framework;
  selecting at least one of the generic components from the catalog;

graphically constructing one or more processes definitions for the processes, each process definition including a series of graphically represented activities linked by one or more transitions and associated with abstract roles specified for the activities wherein at least one activity of said processes invokes the at least one generic component selected from said catalog, whereby a single process is assembled from the implementation-specific components of the multiple different programming languages, the implementation-specific components being compiled modular routines of the heterogeneous applications that have been previously created in the multiple different programming languages; and executing the constructed one or more process definitions at one or more process engines in order to instantiate a process instance, wherein the process instance interacts with the plurality of heterogeneous applications by invoking the generic components of said catalog and wherein the process instance integrates the plurality of heterogeneous applications into the single process by invoking services from the plurality of heterogeneous applications during execution of the activities of said processes.

15. The method of claim 14, further comprising:

providing an organizational repository that includes said catalog, organizational data and the one or more process definitions.

16. The method of claim 14, further comprising:

detecting an error of the one or more process definitions by using a debugger.

17. The method of claim 14, further comprising:

storing transactional data describing the process instance in a data warehouse;

and organizing the transactional data at a data server.

18. The method of claim 14 wherein the implementation module is used to access implementation-specific components associated with at least one of: JAVA, Standard Query Language (SQL), Automation, Enterprise JavaBeans (EJB), CORBA, Remote Method Invocation (RMI), Extensible Markup Language (XML) schemas, Web Services and JAVA Naming and Directory Interface (JNDI).

19. The method of claim 14, further comprising:

consolidating data from multiple process engines by a warehouse server, wherein the warehouse server generates an N-dimensional cube to organize said data, wherein dimensions of the cube represent organizational data and measures of the cube represent transactional data of process instances.

20. A computer having one or more processors to design and execute processes, wherein instructions executed by the one or more processors cause the computer to perform the steps of:

automatically generating a catalog of generic components in a generic introspection framework by introspecting a set of exposed application programming interfaces (APIs) of a plurality of heterogeneous applications implemented in multiple different programming languages and transforming implementation-specific components of the plurality of heterogeneous applications into the generic components of said catalog by binding identifiers of the generic components with identifiers of the implementation-specific components, wherein the catalog contains a series of entries in a binding table automatically created during the introspection of the APIs, each entry representing a generic component which, when invoked, is bound to at least one of the implementation-specific components of said heterogeneous applications upon execution of the processes, the catalog further containing a module comprising the generic components associated with a folder comprising an XML file when the implementation-specific components are saved in the catalog as the generic components;

providing an implementation module that includes procedures to access the APIs and maps the implementation-specific components to the generic components by using its own introspection mechanism and sends the mapped implementation-specific components to the generic introspection framework;

selecting at least one of the generic components from the catalog;

graphically constructing one or more processes definitions for the processes, each process definition including a series of graphically represented activities linked by one or more transitions and associated with abstract roles specified for the activities wherein at least one activity of said processes invokes the at least one generic component selected from said catalog, whereby a single process is assembled from the implementation-specific components of the multiple different programming languages, the implementation-specific components being compiled modular routines of the heterogeneous applications that have been previously created in the multiple different programming languages; and executing the constructed one or more process definitions at one or more process engines in order to instantiate a process instance, wherein the process instance interacts with the plurality of heterogeneous applications by invoking the generic components of said catalog and wherein the process instance integrates the plurality of heterogeneous applications into the single process by invoking services from the plurality of heterogeneous applications during execution of the activities of said processes.

\* \* \* \* \*